US012010462B2

(12) United States Patent
Kuruvilla et al.

(10) Patent No.: US 12,010,462 B2
(45) Date of Patent: *Jun. 11, 2024

(54) SYSTEM AND METHOD FOR OBTAINING VIDEO FOR USE WITH PHOTO-BASED ESTIMATION

(71) Applicant: The Toronto-Dominion Bank, Toronto (CA)

(72) Inventors: Denny Devasia Kuruvilla, Toronto (CA); Esli Gjini, Etobicoke (CA); Sarah Reeve, Toronto (CA); Justin Seto, Markham (CA); Naomi Sarah Feth, Toronto (CA); Anurag Thakur, Toronto (CA); Harjot Singh Panag, Brampton (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/947,570

(22) Filed: Sep. 19, 2022

(65) Prior Publication Data
US 2023/0014766 A1    Jan. 19, 2023

Related U.S. Application Data

(63) Continuation of application No. 16/695,638, filed on Nov. 26, 2019, now Pat. No. 11,483,523.

(51) Int. Cl.
*H04N 7/18* (2006.01)
*G06Q 40/08* (2012.01)
(Continued)

(52) U.S. Cl.
CPC ............ *H04N 7/183* (2013.01); *G06Q 40/08* (2013.01); *G06T 7/0002* (2013.01); *H04L 67/12* (2013.01);
(Continued)

(58) Field of Classification Search
CPC ...... G06Q 40/08; G06T 7/0002; H04N 7/183; H04L 67/12; H04L 67/306
See application file for complete search history.

(56) References Cited

U.S. PATENT DOCUMENTS

| 6,052,631 A | 4/2000 | Busch et al. |
| 7,809,587 B2 | 10/2010 | Dorai et al. |

(Continued)

FOREIGN PATENT DOCUMENTS

| WO | WO-2013021379 A1 * | 2/2013 | ............ G06Q 10/10 |
| WO | 2018159054 | 9/2018 | |

*Primary Examiner* — Scott C Anderson
(74) *Attorney, Agent, or Firm* — Rowand LLP

(57) ABSTRACT

A server comprises a communications module, a processor coupled to the communications module, and a memory coupled to the processor. The memory stores processor-executable instructions which, when executed by the processor, configure the processor to receive, via the communications module and from a remote computing device, video data of a vehicle in an original state, store, in the memory, at least some of the video data of the vehicle and associate the stored video data with an account, receive, via the communications module and from the remote computing device, an indication of a claim, the indication associated with an account identifier, retrieve, using the account identifier and from the memory, the video data of the vehicle in the original state from the memory, and send, via the communications module and to the remote computing device, instructions for obtaining video data of the vehicle based on the video data of the vehicle in the original state.

20 Claims, 19 Drawing Sheets

(51) Int. Cl.
*G06T 7/00* (2017.01)
*H04L 67/12* (2022.01)
*H04L 67/306* (2022.01)

(52) U.S. Cl.
CPC .. *H04L 67/306* (2013.01); *G06T 2207/10016* (2013.01); *G06T 2207/30248* (2013.01)

(56) References Cited

U.S. PATENT DOCUMENTS

| | | |
|---|---|---|
| 8,712,893 B1 | 4/2014 | Brandmaier et al. |
| 9,505,494 B1 | 11/2016 | Marlow et al. |
| 9,589,202 B1 | 3/2017 | Wilbert et al. |
| 9,684,934 B1 | 6/2017 | Wilson, II et al. |
| 10,572,944 B1* | 2/2020 | Brandmaier ............ G06Q 40/08 |
| 10,609,148 B1 | 3/2020 | Tran |
| 2003/0200123 A1 | 10/2003 | Burge et al. |
| 2010/0088123 A1 | 4/2010 | McCall |
| 2011/0040681 A1 | 2/2011 | Ahroon |
| 2015/0100504 A1 | 4/2015 | Binion et al. |
| 2015/0181037 A1* | 6/2015 | Bailey .................... G06Q 40/08 |
| | | 379/88.01 |
| 2016/0012707 A1 | 1/2016 | McKinley |
| 2016/0180265 A1* | 6/2016 | Yanicke ............... G06Q 10/047 |
| | | 705/7.28 |
| 2017/0053461 A1 | 2/2017 | Pal |
| 2017/0330284 A1 | 11/2017 | Tofte et al. |
| 2018/0102051 A1 | 4/2018 | Suthar |
| 2018/0215344 A1 | 8/2018 | Santora |
| 2018/0218753 A1 | 8/2018 | Hodge |
| 2019/0073641 A1 | 3/2019 | Utke |
| 2019/0306205 A1* | 10/2019 | Florey .................... H04L 65/65 |

* cited by examiner

SYSTEM AND METHOD FOR OBTAINING VIDEO FOR USE WITH PHOTO-BASED ESTIMATION

CROSS-REFERENCE TO RELATED APPLICATIONS

This application is a continuation of U.S. patent application Ser. No. 16/695,638, filed on Nov. 26, 2019, the entire contents of which are incorporated herein by reference.

TECHNICAL FIELD

The present application relates to automated processing of claims and, more particularly, to systems and methods for use with photo-based claim processing.

BACKGROUND

When a party wishes to make an insurance claim, that party may contact an insurer by telephone and the insurer may assign a claims adjuster to the claim. The claims adjuster evaluates the claim. In order to evaluate the claim, the claims adjuster may inspect property, such as a vehicle, that is associated with the claim. The claim adjustment process may take a considerable amount of time and effort.

Computers have sometimes been used to improve the claims process. For example, some insurers may provide a web interface that allows for submission of an online claim form. Typically, online claim submissions are routed to a claims adjuster. This claim adjustment process may also be time consuming and result in a large delay prior to processing of a claim.

Photo-based estimation has been used to improve the claims process. Photo-based estimation involves a customer uploading an image which can be used for damage estimation. Photo-based estimation may lead to fraudulent claims being submitted as images are easy to fake or manipulate. For example, a user may upload an image of a vehicle that was retrieved over the internet, rather than an image captured using the user's camera. As another example, an image editing tool may be used to manipulate an image.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
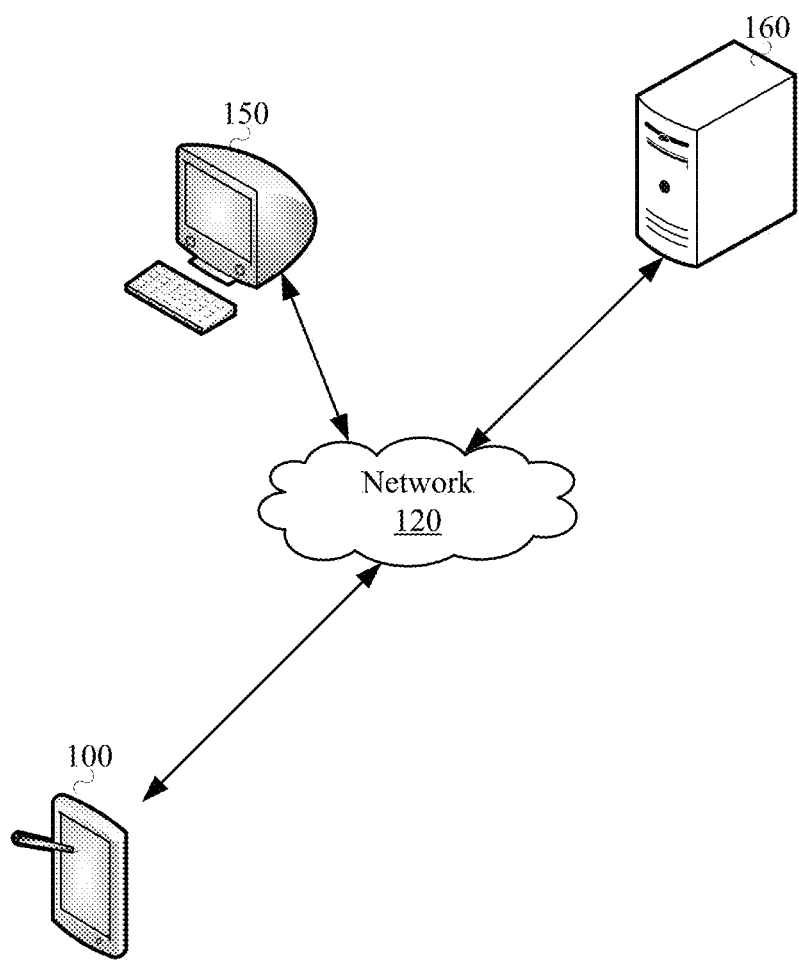
FIG. 1 is a schematic operation diagram illustrating an operating environment of an example embodiment.

According to an aspect, there is provided a server. The server comprises a communications module and a data store storing profiles for parties. The server comprises a processor coupled to the communications module and the data store and a memory coupled to the processor. The memory stores processor-executable instructions which, when executed by the processor, configure the processor to receive, via the communications module and from a remote computing device, a signal representing an indication of a damage location of a vehicle; send, via the communications module and to the remote computing device, instructions for obtaining video data of the vehicle based on the damage location; receive, via the communications module and from the remote computing device, video data of the vehicle; and process the video data to confirm an identity of the vehicle and to numerically quantify an amount of damage to the vehicle.

In one or more aspects, the instructions for obtaining video data of the vehicle include an indication of a starting point and an ending point for video capture.

In one or more aspects, the instructions for obtaining video data of the vehicle include instructions for capturing an identifier of the vehicle.

In one or more aspects, the identifier includes one of a vehicle identification number (VIN) and a license plate number.

In one or more aspects, processing the video data to confirm an identity of the vehicle comprises comparing the identifier of the vehicle to a database record.

In one or more aspects, the instructions for obtaining video data of the vehicle include at least one of text instructions, photo instructions and video instructions.

In one or more aspects, the video data of the vehicle is received as a stream and the processor-executable instructions, when executed by the processor, further configure the processor to evaluate progress of video data capture by the remote computing device; and send, via the communications module and to the remote computing device, an indication of the progress.

In one or more aspects, the processor-executable instructions, when executed by the processor, further configure the processor to send, via the communications module and to the remote computing device, a request to segment the video data into at least an identity portion and a damage portion.

In one or more aspects, processing the video data to confirm an identity of the vehicle comprises processing the identity portion and wherein processing the video data to numerically quantify the amount of damage to the vehicle comprises processing the damage portion.

In one or more aspects, the identity portion is an image obtained from the video data.

According to a further aspect, there is provided a method. The method comprises receiving, via a communications module and from a remote computing device, a signal representing an indication of a damage location of a vehicle; sending, via the communications module and to the remote computing device, instructions for obtaining video data of the vehicle based on the damage location; receiving, via the communications module and from the remote computing device, video data of the vehicle; and processing the video data to confirm an identity of the vehicle and to numerically quantify an amount of damage to the vehicle.

In one or more aspects, the instructions for obtaining video data of the vehicle include an indication of a starting point and an ending point for video capture.

In one or more aspects, the instructions for obtaining video data of the vehicle include instructions for capturing an identifier of the vehicle.

In one or more aspects, the identifier includes one of a vehicle identification number (VIN) and a license plate number.

In one or more aspects, processing the video data to confirm an identity of the vehicle comprises comparing the identifier of the vehicle to a database record.

In one or more aspects, the instructions for obtaining video data of the vehicle include at least one of text instructions, photo instructions and video instructions.

In one or more aspects, the video data of the vehicle is received as a stream and the method further comprises evaluating progress of video data capture by the remote computing device; and sending, via the communications module and to the remote computing device, an indication of the progress.

In one or more aspects, the method further comprises sending, via the communications module and to the remote computing device, a request to segment the video data into at least an identity portion and a damage portion.

In one or more aspects, processing the video data to confirm an identity of the vehicle comprises processing the identity portion and wherein processing the video data to numerically quantify the amount of damage to the vehicle comprises processing the damage portion.

In a further aspect, there is provided a non-transitory computer readable storage medium comprising computer-executable instructions which, when executed, configure a computing device to receive, via a communications module and from a remote computing device, a signal representing an indication of a damage location of a vehicle; send, via the communications module and to the remote computing device, instructions for obtaining video data of the vehicle based on the damage location; receive, via the communications module and from the remote computing device, video data of the vehicle; and process the video data to confirm an identity of the vehicle and to numerically quantify an amount of damage to the vehicle.

In a further aspect, there is provided a server. The server comprises a communications module; a processor coupled to the communications module; and a memory coupled to the processor, the memory storing processor-executable instructions which, when executed by the processor, configure the processor to receive, via the communications module and from a remote computing device, video data of a vehicle in an original state; store, in the memory, at least some of the video data of the vehicle and associate the stored video data with an account; receive, via the communications module and from the remote computing device, an indication of a claim, the indication associated with an account identifier; retrieve, using the account identifier and from the memory, the video data of the vehicle in the original state from the memory; and send, via the communications module and to the remote computing device, instructions for obtaining video data of the vehicle based on the video data of the vehicle in the original state.

In one or more aspects, the indication of the claim includes an indication of a damage location of the vehicle.

In one or more aspects, the instructions for obtaining video data of the vehicle include instructions for obtaining video data of the vehicle at the damage location.

In one or more aspects, the instructions for obtaining video data of the vehicle include an indication of a starting point and an ending point for video capture.

In one or more aspects, the instructions for obtaining video data of the vehicle include instructions for capturing an identifier of the vehicle.

In one or more aspects, the processor-executable instructions, when executed by the processor, further configure the processor to receive, via the communications module and from the remote computing device, video data of the vehicle captured in response to the instructions; and process the video data to numerically quantify an amount of damage to the vehicle.

In one or more aspects, the processor-executable instructions, when executed by the processor, further configure the processor to receive, via the communications module and from the remote computing device, video data of the vehicle captured in response to the instructions; and process the video data to confirm an identity of the vehicle.

In one or more aspects, the processor-executable instructions, when executed by the processor, further configure the processor to process the video data of the vehicle in the original state to identify at least one of pre-existing damage to the vehicle and aftermarket modifications made to the vehicle.

In one or more aspects, the processor-executable instructions, when executed by the processor, further configure the processor to generate a three-dimensional model of the vehicle based at least on the video data of the vehicle in the original state.

In one or more aspects, the instructions for obtaining video data of the vehicle are further based on the three-dimensional model of the vehicle.

In a further aspect, there is provided a method. The method comprises receiving, via a communications module and from a remote computing device, video data of a vehicle in an original state; storing at least some of the video data of the vehicle in memory and associating the stored video data with an account; receiving, via the communications module and from the remote computing device, an indication of a claim, the indication associated with an account identifier; retrieving, using the account identifier and from the memory, the video data of the vehicle in the original state from the memory; and sending, via the communications module and to the remote computing device, instructions for obtaining video data of the vehicle based on the video data of the vehicle in the original state.

In one or more aspects, the instructions for obtaining video data of the vehicle include instructions for obtaining video data of the vehicle at the damage location.

In one or more aspects, the instructions for obtaining video data of the vehicle include an indication of a starting point and an ending point for video capture.

In one or more aspects, the instructions for obtaining video data of the vehicle include instructions for capturing an identifier of the vehicle.

In one or more aspects, the method further comprises receiving, via the communications module and from the remote computing device, video data of the vehicle captured in response to the instructions; and processing the video data to numerically quantify an amount of damage to the vehicle.

In one or more aspects, the method further comprises receiving, via the communications module and from the remote computing device, video data of the vehicle captured in response to the instructions; and processing the video data to confirm an identity of the vehicle.

In one or more aspects, the method further comprises processing the video data of the vehicle in the original state to identify at least one of pre-existing damage to the vehicle and aftermarket modifications made to the vehicle.

In one or more aspects, the method further comprises generating a three-dimensional model of the vehicle based at least on the video data of the vehicle in the original state.

In one or more aspects, the instructions for obtaining video data of the vehicle are further based on the three-dimensional model of the vehicle.

In a further aspect, there is provided a non-transitory computer readable storage medium comprising computer-executable instructions which, when executed, configure a computing device to receive, via a communications module and from a remote computing device, video data of a vehicle in an original state; store, in memory, at least some of the video data of the vehicle and associate the stored video data with an account; receive, via the communications module and from the remote computing device, an indication of a claim, the indication associated with an account identifier; retrieve, using the account identifier and from the memory, the video data of the vehicle in the original state from the memory; and send, via the communications module and to the remote computing device, instructions for obtaining video data of the vehicle based on the video data of the vehicle in the original state.

Photo-based claims estimation techniques are described herein. For example, a remote computing device, such as a smartphone, may be used to submit a claim to a remote server. During the claim submission, photo-based estimation may be employed to automatically evaluate and process at least some claims. Photo-based estimation allows for automated adjudication of a claim based on video or image data obtained using the remote computing device. More specifically, video or image data may be algorithmically analyzed to quantify an amount of damage to insured property, such as an insured vehicle, and to automatically determine a repair or replacement cost for the insured property. Further, video or image data may be analyzed to confirm an identity of the insured property.

Conveniently, where photo-based estimation is employed, claim adjustment may be provided automatically and in real time. For example, a processing server may automatically send instructions for obtaining video or image data of an insured vehicle and, upon receiving the video or image data, the processing server may evaluate the video or image data in order to confirm an identity of an insured vehicle, quantify an amount of damage to the insured vehicle and may then automatically propose a settlement amount based on the amount of damage.

As another example, a processing server may automatically send instructions for obtaining video data of damage made to an insured vehicle. The processing server may analyze the video data in order to confirm an identity of an insured vehicle, quantify an amount of damage to the insured vehicle and may automatically propose a settlement amount based on the amount of damage. By requiring the user to obtain video data, risk of fraud is reduced as video data is more difficult to edit, fake, or manipulate compared to image data.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a server 160 and a remote computing device 100, such as a smartphone, communicate via a network 120.

The remote computing device 100 and the server 160 may be in geographically disparate locations. Put differently, the remote computing device 100 may be remote from the server 160.

The remote computing device 100 and the server 160 are computer systems. The remote computing device 100 may take a variety of forms including, for example, a mobile communication device such as a smartphone, a tablet computer, a wearable computer such as a head-mounted display or smartwatch, a laptop or desktop computer, or a computing device of another type.

The remote computing device 100 is adapted to present a graphical user interface that allows for remote submission of a claim to the server 160. For example, the remote computing device 100 may be adapted to submit claim information through a chat interface and/or mobile application that may be provided on the remote computing device 100. By way of example, the claim information may include video or image data associated with the claim. The video or image data may represent a portion of an insured vehicle, for example.

As further described below, the server 160 is adapted to perform automated claim processing of at least some claims. For example, the server 160 may be a claims processing server, which may also be referred to as a processing server, which is configured to selectively perform photo-based estimation. In doing so, the server 160 may receive video or image data of at least a portion of a vehicle and may analyze the video or image data to confirm an identity of the vehicle and to automatically determine a value associated with a claim. For example, the server 160 may automatically determine an estimate of a repair or replacement cost associated with the claim based on the video or image data and may provide the estimate to the remote computing device 100 for display. Operations associated with the server 160 will be described in greater detail below.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, a telecommunications network or the like.

As further explained below, the remote computing device 100 communicates with the server 160 via the network 120 in order to allow for a claim submitted by the remote computing device 100 to be automatically processed by the server 160. That is, in at least some embodiments, the server 160 may process the claim without any human intervention.

As illustrated in FIG. 1, the server 160 and/or the remote computing device 100 may also communicate with an operator device 150. The operator device 150 is or includes a computing device.

The operator device 150 is adapted to be operated by an operator, who may be a claims processor. In at least some embodiments, the operator device 150 may only be engaged when the server 160 determines that automated claims processing, such as photo-based estimation, is not available. For example, when the server 160 determines that automated claims processing is not available (e.g., if the risk of using photo-based estimation is too high, if images appear to have been tampered with, etc.), it may hand off a chat session between a chat-bot on the server 160 and a user on the remote computing device 100 to the operator device 150 so that an operator may engage in a remote chat with the user via the network 120. When the server 160 hands off the chat session, it may do so unbeknownst to the user. That is, the chat-bot may simply cease operating and the operator may take over seamlessly. To facilitate such handoff, the server 160 may provide the operator device 150 with a chat history when the chat session is handed over to the operator device 150.

Accordingly, the operator device 150 may communicate with one or both of the server 160 and the remote computing device 100 via the network 120.

Figure 2:
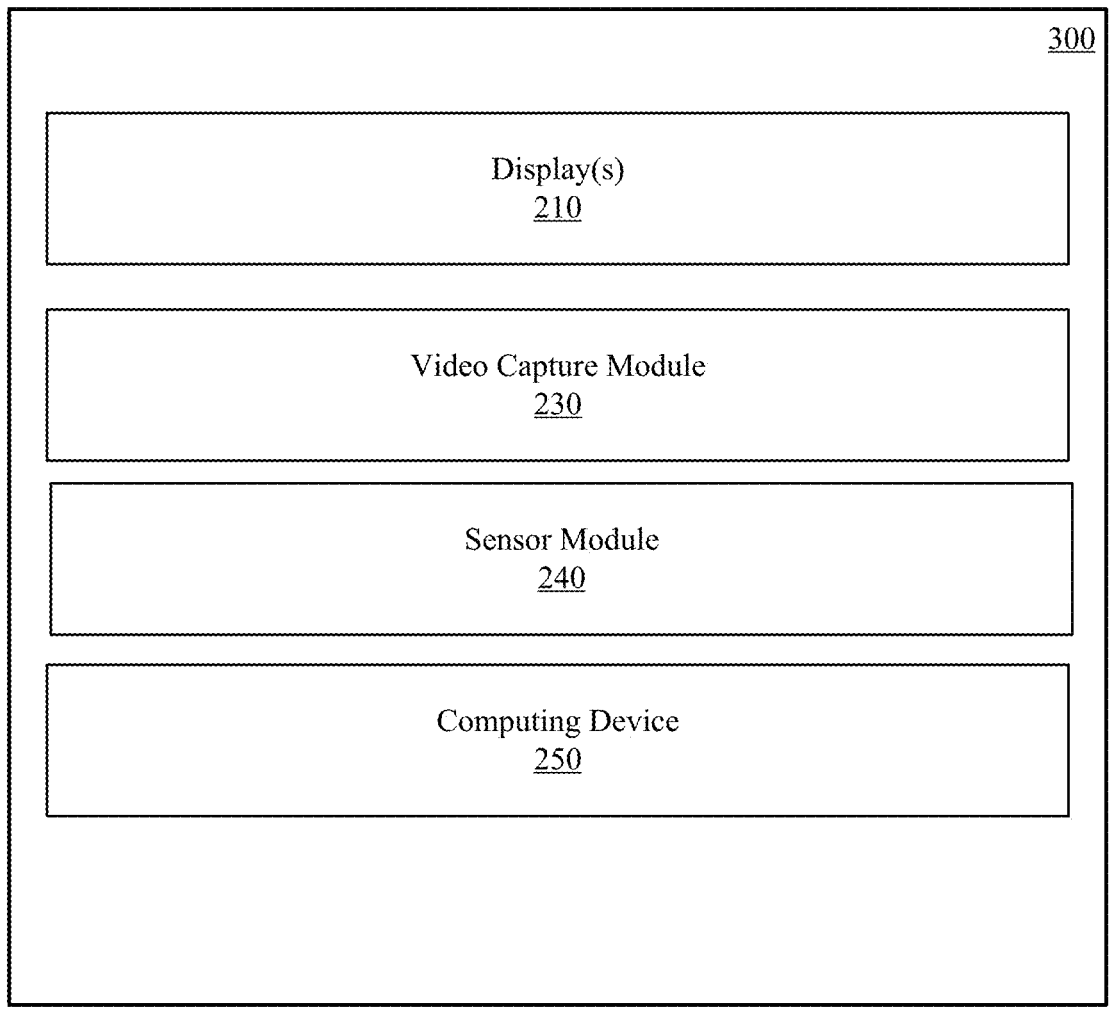
FIG. 2 is a simplified schematic diagram showing components of a computing device.

FIG. 2 is a simplified schematic diagram showing components of the remote computing device 100.

The remote computing device 100 may include modules including, as illustrated, for example, one or more displays 210, a video capture module 230, a sensor module 240, and a computing device 250.

The one or more displays 210 are a display module. The one or more displays 210 are used to display user interface screens that may be used, for example, to submit a claim to the server 160 (FIG. 1). The one or more displays 210 may be internal displays of the remote computing device 100 (e.g., disposed within a body of the remote computing device).

The video capture module 230 may be or may include a camera. The video capture module may be used to obtain video data, such as videos, and image data, such as images. As will be described in greater detail herein, video or image data obtained by the video capture module 230 may be used for photo-based estimation during processing of a claim. The video capture module 230 may be or may include a digital image sensor system as, for example, a charge coupled device (CCD) or a complementary metal-oxide-semiconductor (CMOS) image sensor.

The video capture module 230 and the display 210 may cooperate in at least one operating mode of the remote computing device 100 to provide a viewfinder. The viewfinder may display camera data obtained via the video capture module 230 in real time or near real time on the display 210.

The sensor module 240 may be a sensor that generates sensor data based on a sensed condition. By way of example, the sensor module 240 may be or include a location subsystem which generates sensor data that is a location. The location may be the current geographic location of the remote computing device 100. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computing device 250 is in communication with the one or more displays 210, the video capture module 230, and the sensor module 240. The computing device 250 may be or may include a processor which is coupled to the one or more displays 210, the video capture module 230, and/or the sensor module 240.

Figure 3:
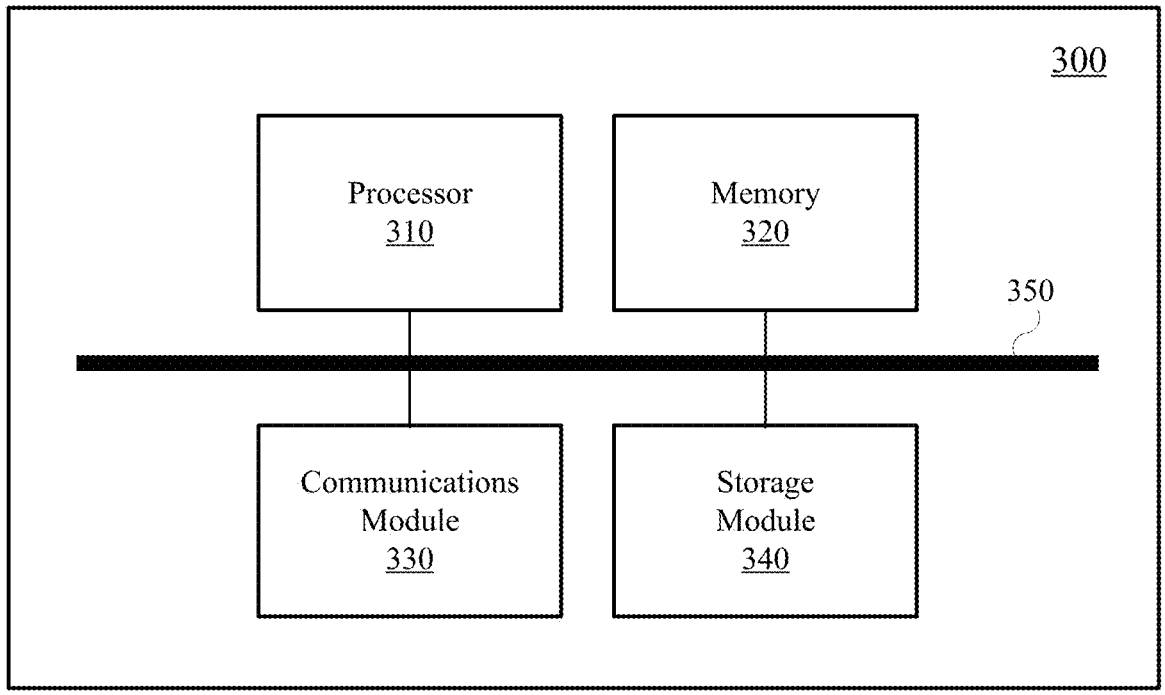
FIG. 3 is high-level schematic diagram of an example computing device.

FIG. 3 is a high-level operation diagram of an example computing device 300. In some embodiments, the example computing device 300 may be exemplary of the computing device 250 (FIG. 2) and/or the server 160 (FIG. 1) and/or the operator device 150 (FIG. 1).

The example computing device 300 includes a variety of modules. For example, as illustrated, the example computing device 300 may include a processor 310, a memory 320, a communications module 330, and/or a storage module 340. As illustrated, the foregoing example modules of the example computing device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 300.

The communications module 330 allows the example computing device 300 to communicate with other computing devices and/or various communications networks. For example, the communications module 330 may allow the example computing device 300 to send or receive communications signals. Communications signals may be sent or received according to one or more protocols or according to one or more standards. For example, the communications module 330 may allow the example computing device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computing device 300 to communicate using near-field communication (NFC), via Wi-Fi™, using Bluetooth™ or via some combination of one or more networks or protocols. In some embodiments, all or a portion of the communications module 330 may be integrated into a component of the example computing device 300. For example, the communications module may be integrated into a communications chipset. In some embodiments, the communications module 330 may be omitted such as, for example, if sending and receiving communications is not required in a particular application.

The storage module 340 allows the example computing device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any)

accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
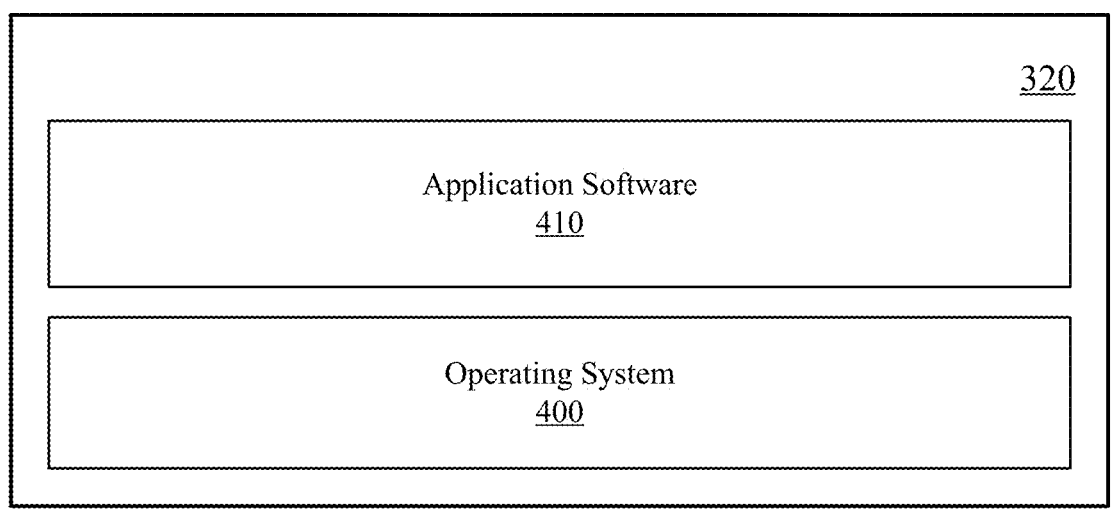
FIG. 4 shows a simplified organization of software components stored in a memory of the example computing device of FIG. 3.

FIG. 4 depicts a simplified organization of software components stored in the memory 320 of the example computing device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computing device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computing device 300, in combination with the operating system 400, to operate as a device performing a particular function. For example, the application 410 may cooperate with the operating system 400 to adapt a suitable embodiment of the example computing device 300 to operate as the computing device 250 (FIG. 2) of the remote computing device 100 (FIG. 1) or as the server 160 (FIG. 1) or as the operator device 150 (FIG. 1).

Where the application 410 is provided on the remote computing device 100, the application may be a submission application, which may also be referred to as a claim submission application. The application 410 may be a web-based or standalone application. The application 410 may be configured to engage in an authenticated session with the server 160. The authenticated session may occur, for example, after the remote computing device 100 has validly authenticated itself to the server 160 using, for example, one or more credentials. During the authenticated session, the remote computing device 100 may engage in encrypted communications with the server 160. For example, as will be described below, the remote computing device 100 may send, via the communications module, video or image data to the server 160 and the server may analyze the video or image data to automatically process a claim (i.e., using photo-based estimation). The video or image data may be sent in an encrypted format. Conveniently, the encrypting of the video or image data may ensure that the server 160 only receives and processes videos from authentic submission applications. Non-authentic submission applications cannot submit such video or image data since they are not able to encrypt the video or image data in a format that would be recognized or accepted by the server 160.

Where the application 410 is provided on the server 160, the application 410 may include a plurality of software modules associated with claim processing. For example, a fraud detection module may include computer-executable instructions for identifying possible fraudulent claims based on the video or image data, a vehicle detection module may include computer-readable instructions for identifying a vehicle using video or image data, an instruction module may include computer-executable instructions for generating or retrieving instructions on how to obtain video or image data of a vehicle, a claim routing module may include computer-executable instructions for determining whether photo-based estimation is to be used or whether manual estimation is to be used, a photo-based estimation module may be used for processing a claim using photo-based estimation techniques, and/or a manual estimation module may be used for engaging an operator device 150 (FIG. 1) to process a claim manually. Other modules apart from those listed above may be included instead of or in addition to the modules identified and the functions described as being attributed to a specific module may instead be provided by another module. Further, one or more of the modules may not be included in the application 410 and/or may not be provided by the server 160 itself. For example, the server 160 may cooperate with other servers or computer systems which may provide some such functions.

At least some components illustrated in FIG. 3 or FIG. 4 may take different forms depending on which of the computing devices they are provided on. For example, a server 160 may include or have access to a storage module 340 (which may also be referred to as a data store) which has stored thereon profiles for a plurality of parties, who may also be referred to as users or customers. The users may be insured persons, for example. The profiles may be or include policy data such as insurance policy data. The insurance policy data may be stored as a database record. The insurance policy data may specify information associated with an insurance policy which may, for example, be a vehicle insurance policy for an insured vehicle. The insurance policy data may, for example, include identification information or data for an insured person or an insured vehicle. By way of example, the insurance policy data for a given one of the profiles may specify vehicle identifying data for an insured vehicle. By way of example, the insurance policy data may specify a vehicle type of an insured vehicle. The vehicle type may be or include one or more of an indication of whether the vehicle is a car, an indication of whether the vehicle is a truck, an indication of whether the vehicle is a sports utility vehicle, an indication of whether the vehicle is a motorcycle, a make of the vehicle (e.g., a manufacturer name), a model of the vehicle (e.g., a model name), a year of the vehicle (e.g., a year or production or "model year" of the vehicle), a trim line indication for the vehicle (which may also be referred to as a grade of the vehicle or trim level), an indication of a paint colour, and/or an indication of an aftermarket modification (which may indicate whether any aftermarket modifications have been performed on the vehicle (e.g., lowering the car, adding a spoiler, etc.).

Alternatively or additionally, the insurance policy data may specify any one or more of: a vehicle identification number (VIN) for an insured vehicle, a policy identifier associated with a profile (e.g., an insurance policy number), one or more user identifiers (e.g., a name, address and/or contact information) and/or a location.

The profiles may also include other information or data about an insured vehicle. For example, a logo (such as a manufacturer logo), a vehicle body template, and/or a three-dimensional vehicle model may be included in one or more of the profiles. Some such data may be used, for example, to evaluate a claim. For example, a logo displayed in an image submitted to the server 160 by the remote computing device 100 may be used to determine whether the image is of an insured vehicle. For example, the logo may be compared with the logo in the profile.

It will be appreciated that at least some of the information described above as being provided in the profile may, instead, be stored elsewhere and may be retrieved based on data in an active profile. For example, the server 160 may determine that a user is associated with a particular one of the profiles and may retrieve one or more of a VIN, a year, a make and a model of an insured vehicle from that profile. The server 160 may then use the VIN, year, make and/or model to determine further information about the vehicle, such as the logo, vehicle body template and/or three-dimensional vehicle model.

In some embodiments, the profiles may store an indication of whether a customer is eligible for photo-based estimation. The indication may, for example, be a flag. The flag may be considered by the server 160 when the server 160 determines whether a claim should be routed to photo-based estimation or whether the claim should be routed to manual estimation.

The storage module 340 may, in some embodiments, store a set of makes and models that are or are not eligible for photo-based estimation. For example, a whitelist and/or blacklist of vehicle types may be stored. The whitelist may indicate vehicle types that are eligible for photo-based estimation and the blacklist may indicate vehicle types that are not eligible for photo-based estimation. The server 160 may use the whitelist or blacklist in determining whether photo-based estimation should be used to automatically process a claim.

Each profile may be associated with one or more credential that may be stored therewith. The credential may be or include any one or more of: a token, a policy identifier, a user name, a personal identification number (PIN), biometric data, and/or a password. The credential may be used by the server 160 to authenticate the remote computing device 100. More specifically, the credential may be used to determine that the remote computing device 100 is being operated by an authorized user and to identify a profile that is to be used while interacting with that user via the remote computing device 100 (i.e., to identify an "active" profile).

The storage module 340 may store data representing preferred scenes for vehicles for a plurality of vehicle types. The preferred scenes may each be associated with a vehicle type and a damage location. For example, a given one of the preferred scenes may be associated with damage near a front left wheel for a particular make of vehicle. The data regarding the preferred scenes may, for example, reflect a base vehicle and the data regarding the preferred scenes may be used to aid a user in capturing video or image data of a vehicle that will be suitable for photo-based estimation. For example, instructions may be sent to the user to aid the user in capturing video data of the vehicle. As will be described in more detail below, the instructions may be selected based on what part of the vehicle is damaged.

Operations performed by the remote computing device 100 and the server 160 will now be described.

Figure 5:
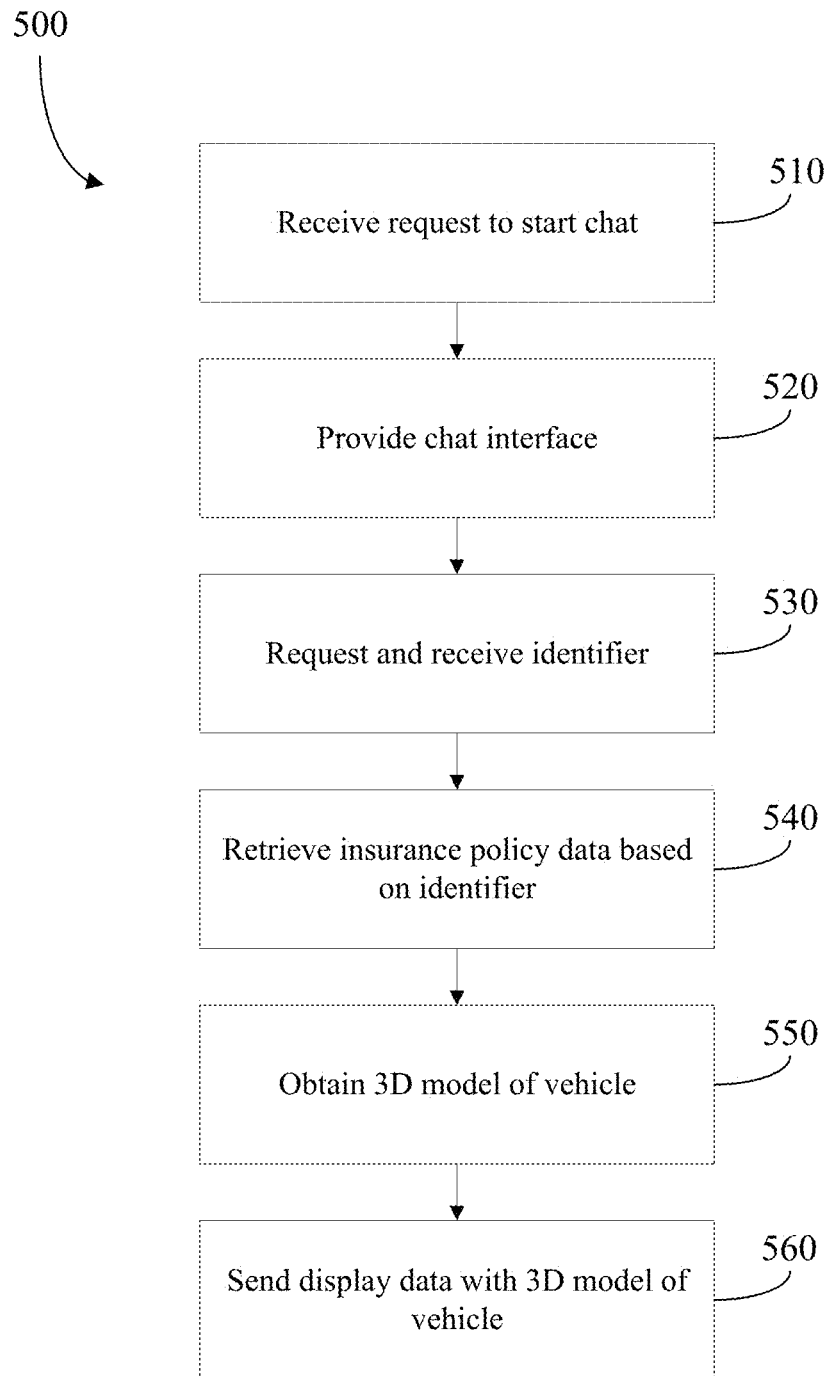
FIG. 5 is a flowchart showing operations performed by a server in routing a claim.

FIG. 5 is a flowchart showing a method 500 for routing a claim. The operations in method 500 are performed by server 160. More specifically, computer-executable instructions stored in memory of the server 160 may, when executed by a processor of the server 160, configure the server 160 to perform the method 500 or a portion thereof.

Method 500 begins when a request is received, via the communications module and from a remote computing device, to initiate a chat session (step 510). In this embodiment, the chat session may be initiated by a user of the remote computing device to start a new claim. The chat session may be requested through an internet interface, mobile application, etc.

In response, the server 160 provides a chat interface to the remote computing device 100 (step 520). In this embodiment, the server 160 sends, via a communications module and to the remote computing device, data that includes a chat interface.

Figure 6:
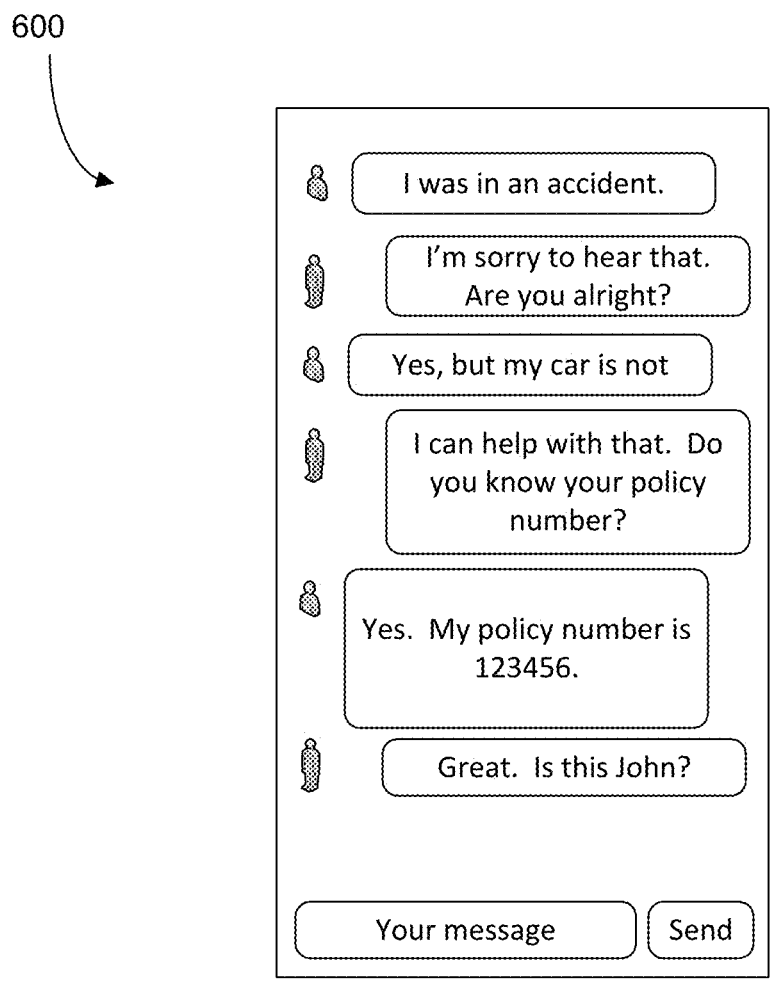
FIG. 6 is an example screen of a graphical user interface.

An example chat interface 600 is shown in FIG. 6. The chat interface allows a user of the remote computing device 100 to send instant text messages to the server 160. The server 160 receives such messages and uses a chat bot to respond to such messages. The chat bot analyzes the messages to extract data from such messages and/or to formulate and send a reply to such messages. The chat bot may, for example, automatically engage in a dialogue with the server 160 in an attempt to obtain data regarding a claim. For example, the chat bot may attempt to obtain answers to one or more predetermined questions that may be used for claim routing purposes.

The server 160 may be equipped with a natural language processing engine which may be used to interpret messages received from the remote computing device 100. In the example shown in FIG. 6, the server 160 receives, from the remote computing device 100, a message indicating that a user of the remote computing device 100 was in an accident. In response, the server 160 analyzes the message and determines, from the message, that a user has a claim to submit (e.g. by determining that the user has been in an accident). The server 160 may then consult a predetermined question list to identify a question to send to the remote computing device 100. The identified question, in the example, is "are you alright". The server 160 may continue to receive answers to questions and may send replies, which may be additional questions, to the remote computing device 100. The server 160 may, therefore, engage in a chat with the remote computing device 100 which may, in some example embodiments, appear to a user of the remote computing device to involve a human operator but which, in fact involves a chat bot. In other embodiments, the remote computing device 100 may be informed that it is engaging with a chat bot and may generate an output, such as a display, which informs a user of the chat-bot.

The chat-bot may, therefore, be configured to prompt a user of the remote computing device 100 to input one or more data points that may be used to automatically evaluate a claim, as will be described in more detail below.

Once the chat interface is initiated, the server 160 continues to receive, via the communications module and from the remote computing device 100, data including input received at the remote computing device through the chat interface. The chat interface provides a free-form input interface which allows for the input of information via text or speech and the chat bot may perform natural language processing to identify relevant information.

During the chat session, the server 160 requests and receives an identifier from the user (step 530). In the example shown in FIG. 6, the server 160 asks the user to provide a policy number. As will be appreciated, the chat may prompt the user to provide other identifiers such as a name, address, contact information, etc. Other examples may be one or more of a token, a PIN, a user name, biometric data, and/or a password.

Those skilled in the art will appreciate that although, in FIG. 6, the credential is received within the chat interface, the credential may be received outside of the chat interface. For example, a submission application on the remote computing device 100 may provide a token to the server 160 or a password to the server 160. As another example, the user may open a mobile application on the remote computing device 100 which may retrieve a previously stored username and password and automatically log the user in. Upon login, the chat interface may be provided.

The server 160 retrieves insurance policy data based on the received identifier (step 540). In this embodiment, the insurance policy data includes one or more identifiers of a vehicle associated with the insurance policy data and one or more identifiers of a user associated with the insurance policy data. The identifiers of the vehicle may be the VIN, the make, the model and/or the year of the insured vehicle. The identifier of the user may be the first name, last name, phone number and/or address. Other examples of insurance policy data that may be retrieved or obtained is described in greater detail above.

In the example shown in FIG. 6, an account has been identified based on the policy number and insurance policy data is obtained. The server 160 automatically retrieves the first name of the user associated with the insurance policy data and asks the user to confirm their identity.

Once the insurance policy data has been retrieved, the server 160 obtains a three-dimensional (3D) vehicle model of the insured vehicle (step 550). The 3D vehicle model may be obtained from a data store that stores a plurality of 3D vehicle models. Each 3D vehicle model may be associated with a particular type of vehicle and, in identifying the 3D vehicle model, the server 160 may first identify a vehicle type from the insurance policy data. The vehicle type may be one or more of a car, a truck, a sports utility vehicle, a motorcycle, a make of the vehicle, a model of the vehicle, a year of the vehicle, a trimline of the vehicle, and/or an indication of an aftermarket modification of the vehicle. After identifying the vehicle type of the insured vehicle from the identified profile, the server 160 may then retrieve the three-dimensional vehicle model from a vehicle model database based on the vehicle type.

In some instances, the retrieved 3D vehicle model may represent the same vehicle as the insured vehicle (i.e., the same year, make and model). In other embodiments, the retrieved 3D vehicle model may be of a similar (but not the same) vehicle to the insured vehicle. For example, the vehicle may be of a common type (e.g., an SUV where the insured vehicle is an SUV). As will be described in more detail, the retrieved 3D vehicle model may be a 3D vehicle model of the vehicle generated during onboarding.

In some instances, the server 160 may have access to redesign timeline data. The redesign timeline data may, for example, indicate years when a vehicle underwent a redesign (as opposed to a minor refresh which occurs in most model years). That is, the redesign timeline data may define vehicle generations. A vehicle generation is represented by date ranges which indicate the times when the vehicle had a generally common design. When a redesign occurs, a new vehicle generation begins.

The redesign timeline data may be used by the server 160 when selecting an appropriate 3D vehicle model. For example, when selecting an appropriate 3D model to use for a given insured vehicle, the server 160 may prefer to select a 3D vehicle model that is within a same vehicle generation as the insured vehicle. The server 160 may be configured to, for example, select a 3D vehicle model of a vehicle that is of the same vehicle generation as an insured vehicle, even if there is another 3D vehicle model of a vehicle that has a closer model year but that is of a different vehicle generation. For example, if 3D vehicle models are available for a particular vehicle in 2012 and 2018 and an insured vehicle is a 2017 vehicle, and if the redesign timeline data indicates that a redesign occurred in 2018, the server 160 may select the 2012 version of the 3D vehicle model.

Once the 3D vehicle model is obtained, the server 160 sends, via the communications module to the remote computing device, display data that includes the 3D vehicle model (step 560). In this embodiment, the 3D vehicle model may be displayed as a message below a last message displayed in the chat interface. The display data may also include a damage location indicator overlaid on the three-dimensional vehicle model. The damage location indicator is selectable by the user of the remote computing device to input an indication of a damage location.

Figure 7:
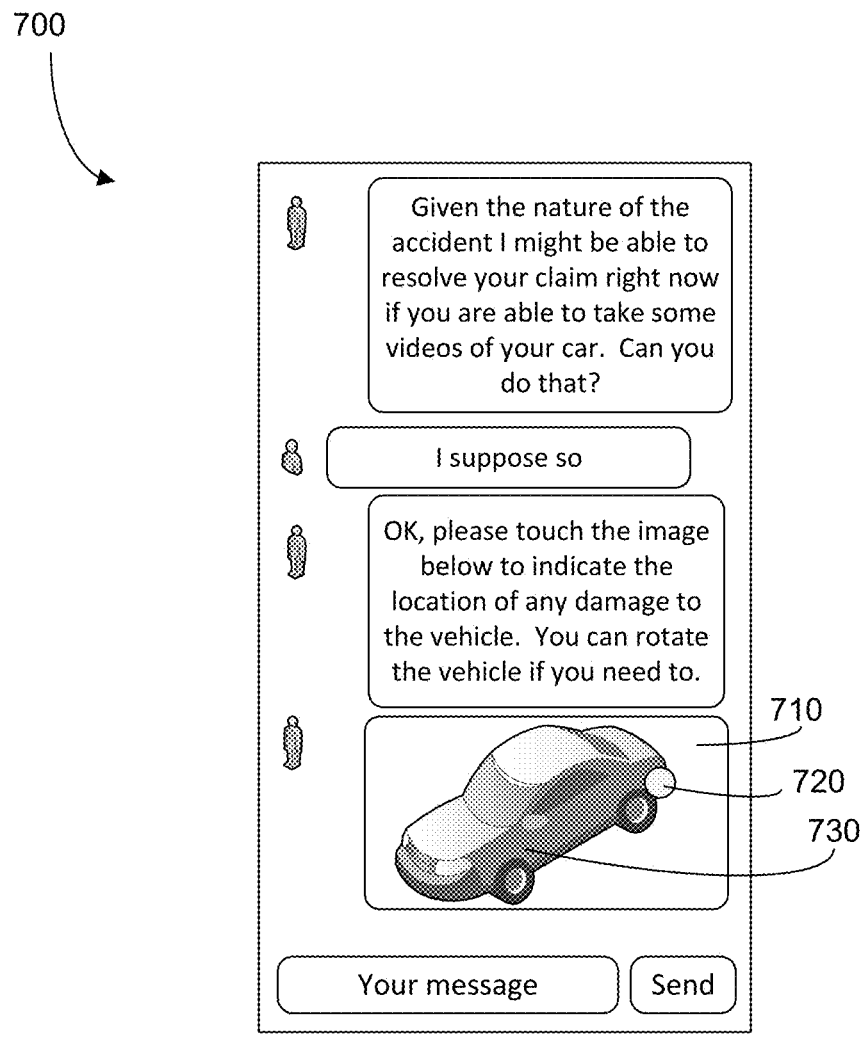
FIG. 7 is an example screen of a graphical user interface.

The display data may include a graphical user interface that allows for interaction with the 3D vehicle model. An example of one such graphical user interface is shown in display screen 700 in FIG. 7. As can be seen, display screen 700 includes a graphical user interface 710 that includes a 3D vehicle model 720 and a damage location indicator 730.

The graphical user interface 710 may allow for rotation of the 3D vehicle model 720. For example, the vehicle may be rotated on the display by selecting an area associated with the vehicle and moving a pointing device (such as a finger) in a direction of rotation after such selection. Touch gestures may, for example, be used to control an angle of rotation associated with the 3D vehicle model. The three-dimensional model may be rendered using OpenGL ES, for example.

The damage location indicator 730 is overlaid on the 3D vehicle model 720. The damage location indicator 730 is selectable by a user via an input interface (such as a touchscreen) associated with the remote computing device 100. The damage location indicator may include a plurality of selectable locations. Each selectable location may be associated with location information defining a location. For example, the plurality of selectable locations may be or include a grid.

In some instances, the display data may include a selectable option to toggle between 2D and 3D viewing. In some embodiments, the display data may allow a user to indicate a location in 2D by selecting for example, three planes and adjusting accordingly. In such instances, there may be a selectable feature or gesture which allows the user to toggle between the 2D and 3D views. In some instances, the views may be displayed in planes perpendicular to the plane being set. In some instances, the plane being set may be highlighted on the visual interface in the chat session for the user to interact with.

Figure 8:
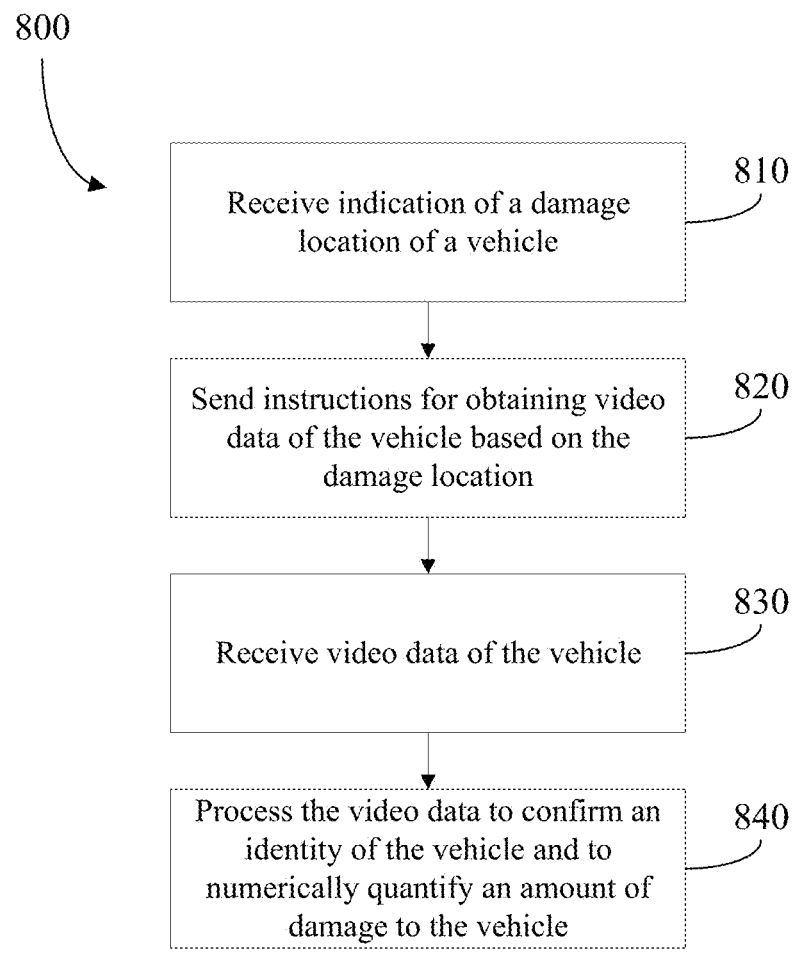
FIG. 8 is a flowchart showing operations performed by a server for performing photo-based estimation.

The remote computing device 100 receives the display data and displays the 3D vehicle model and the damage location indicator overlaid thereon. An input may be received at the remote computing device 100 via the input interface. The input may be a selection of the damage location indicator. The selection may be made, for example, using force touch (iOS) or double tap (Android) or using other gestures. After receiving the input, the remote computing device 100 may send the indication of the damage location to the server 160. The server 160 may use the indication of the damage location to facilitate photo-based claim processing according to a method 800 shown in FIG. 8. The operations in method 800 are performed by server 160. More specifically, computer-executable instructions stored in memory of the server 160 may, when executed by a processor of the server 160, configure the server 160 to perform the method 800 or a portion thereof.

Method 800 begins when the server 160 receives, from the remote computing device 100, an indication of a damage location of a vehicle (step 810). The indication of the damage location may be based on a selection of one of a plurality of locations specified in the damage location indicator. The indication of the damage location may indicate, to the server 160, a location where a vehicle has sustained damage. In one example, the indication of the damage location may indicate a side (e.g., left, right, front, back) associated with the damage. As will be appreciated, multiple damage locations may also be indicated.

Using the instructions module, the server 160 obtains instructions for obtaining video data of the vehicle based on the damage location and sends the instructions to the remote computing device 100 (step 820). In this embodiment, the instructions for obtaining video data may be obtained from a data store that stores a plurality of instruction sets. Each instruction set may be associated with a particular damage location and/or a particular vehicle type. Each instruction set may include a starting point and an ending point for obtaining video data of the vehicle at the damage location. Each instruction set may be video instructions, photo instructions and/or text instructions. In the event that multiple damage locations are identified, the server may concatenate multiple instruction sets to ensure all damage locations are captured by the user in a single video. For example, if the damage locations include the front bumper and the passenger side door, the server 160 may obtain separate instruction sets for obtaining video data of the bumper and for obtaining video data of the passenger side door and may concatenate these instruction sets into a single instructional video. An instruction set for obtaining video data of an identifier of the insured vehicle may always be concatenated to the beginning or end of other instruction sets to ensure the vehicle identifier is always included in the instructions. The identifier may be the VIN and/or a license plate number.

In another example, instruction sets may be concatenated in a random order such that each time instructions are obtained they may be in a different order. This may further help to prevent fraud. In another example, the starting point and/or ending point may be selected randomly. For example, the first time video data is to be obtained of a bumper, the starting point may be randomly set as the left hand side of the bumper. The next time video data is to be obtained of a bumper, the starting point may be randomly set as the right hand side of the bumper. In another example, an instruction set for obtaining video data of an identifier of the insured vehicle may be concatenated in a random position relative to the other instruction sets. For example, instructions may request that the identifier be obtained at the beginning, middle or end of the instructions. As another example, the identifier may be obtained at the beginning and end of the instructions.

Figure 9:
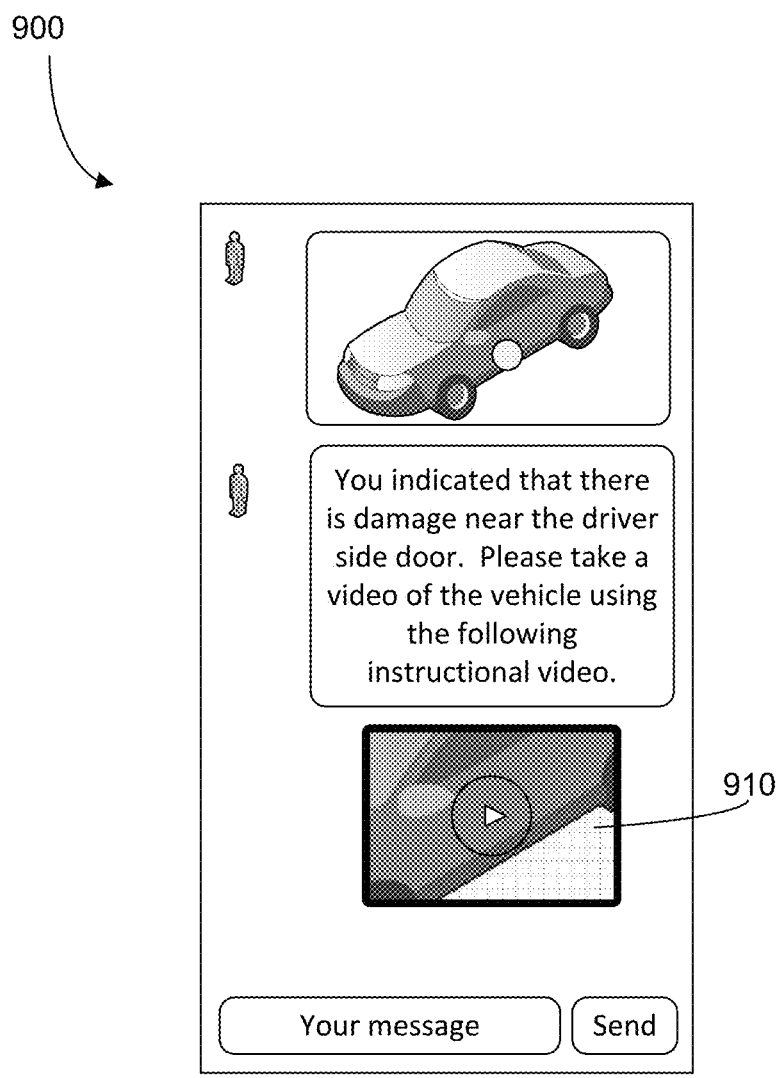
FIG. 9 is an example screen of a graphical user interface.

An example display screen 900 is shown in FIG. 9. As can be seen, the damage location has been identified as the driver side door of the vehicle. As a result, the server 160 sends, via the communications module, instructions in the form of video instructions to the remote computing device 100, shown as video instruction interface 910. The user of the remote computing device may play the video instructions by providing input via the input interface. For example, the user may perform a touch gesture at the location of the video instruction interface 910. The video instructions include a video that shows the user how to obtain video data of the vehicle at the damage location. The video shows a starting point and ending point for obtaining video data of the vehicle. The video may also show the user how to obtain video data of the vehicle to obtain an identifier of the insured vehicle. For example, the video may start with a video on how to obtain video data of the VIN and then how to obtain video data of the vehicle at the damage location. Put another way, the instructions may indicate to the user that the start point of the video is to obtain video data of the VIN.

Figure 10A:
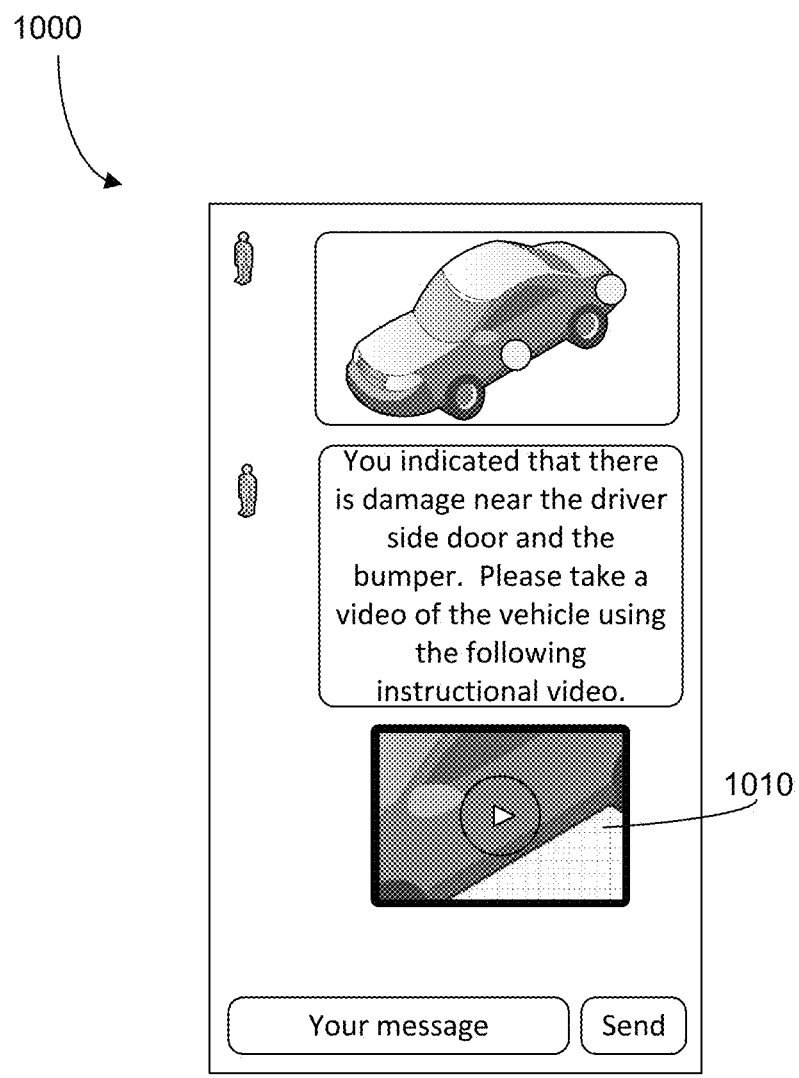
FIGS. 10A to 10D are example screens of graphical user interfaces.
Figure 10B:
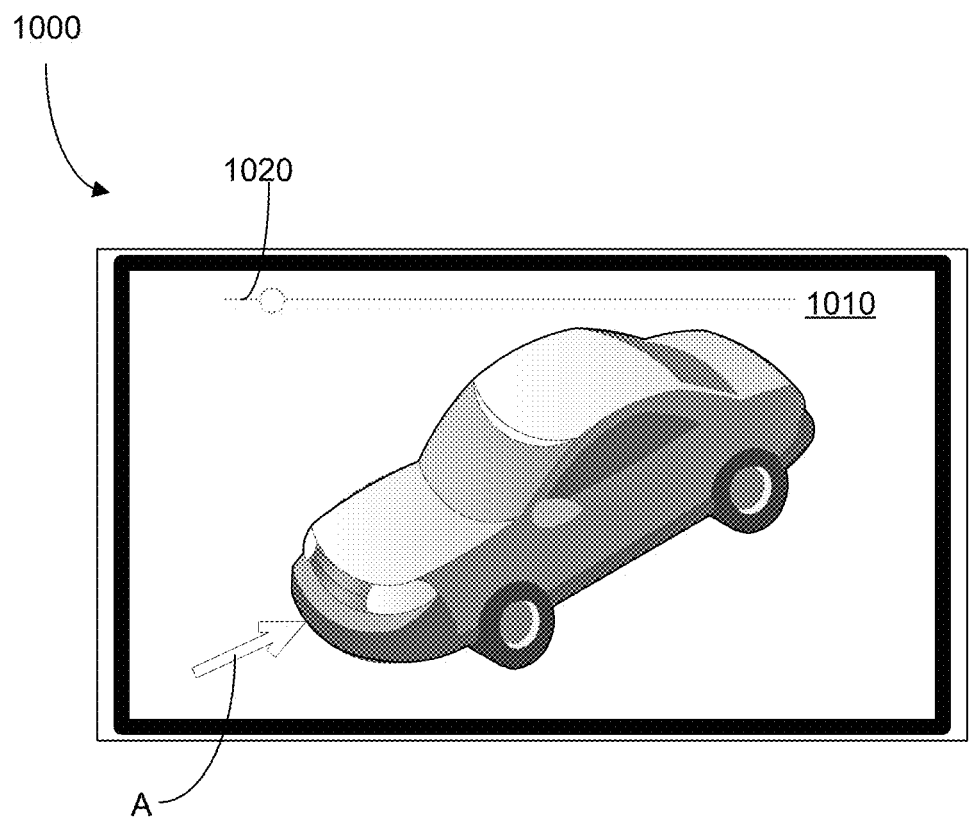
Figure 10C:
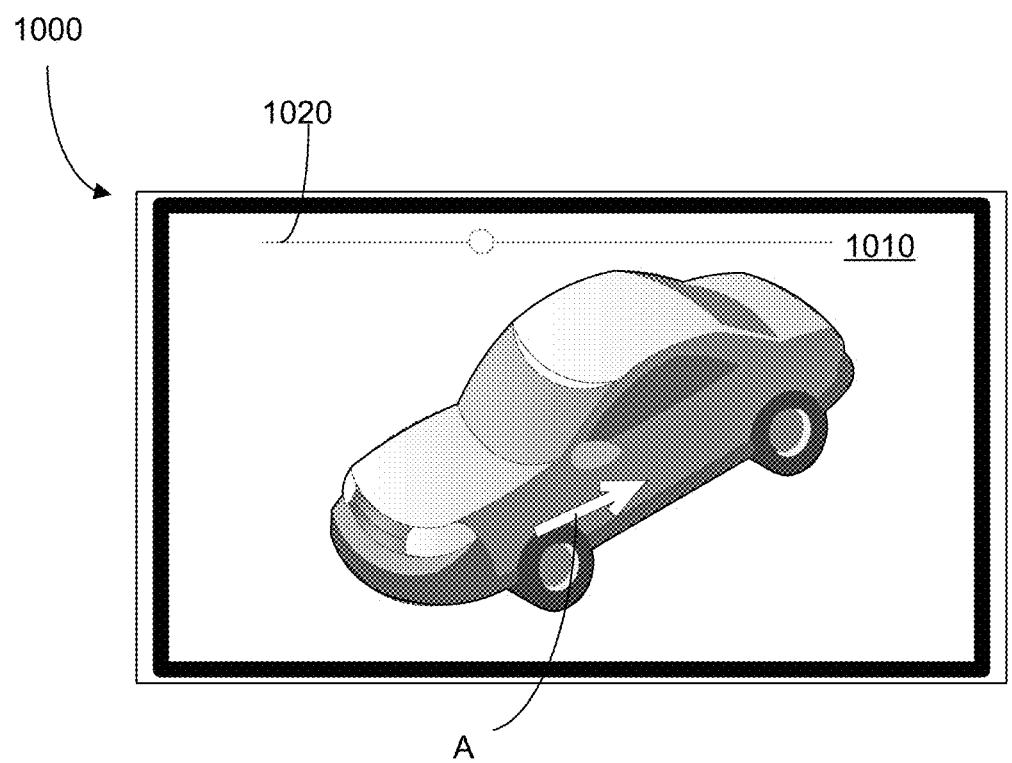
Figure 10D:
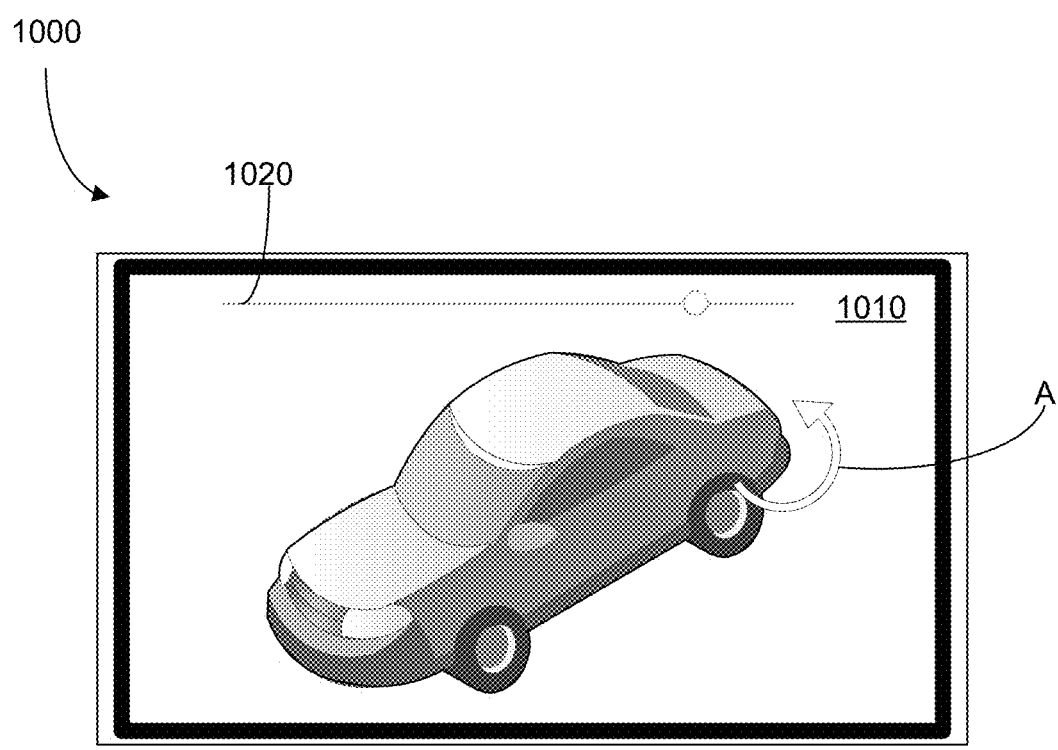

Another example display screen 1000 is shown in FIGS. 10A to 10D. In this example, the damage locations have been identified as the driver side door and the rear bumper. As a result, the server 160 sends, via the communications module, instructions in the form of video instructions to the remote computing device 100, shown as video instruction interface 1010. As can be seen, the video instructions instruct the user to obtain video data of the license plate (FIG. 10B), the driver side door (FIG. 10C) and then the rear bumper (FIG. 10D). The video instructions include an arrow A indicating to the user a particular direction that the video data should be obtained. It will be appreciated that the video instructions shown in FIGS. 10B to 10D are screen shots of the video being played after the user has performed a touch gesture to play the video. A progress bar 1020 is shown in FIGS. 10B to 10D indicating to the user how much time is left in the instructional video.

The video data is received, via the communications module and from the remote computing device 100, by the server 160 (step 830).

The video data may be received by the server 160 after video data capture has been completed by the user. In this example, a single video data file may be received by the server 160. It will be appreciated that once the video data is received, the server 160 may ask the user if there are additional damage locations. If additional damage locations exist, steps 810 and 820 may be repeated until all damage locations have been captured. Each time additional video data is to be captured, the instructions may require the user to capture an identifier of the vehicle.

In an example where the video data is received by the server 160 after video data capture has been completed by the user, the server 160 may request that the user identify portions of the video data that correspond to particular locations. For example, instructions may be sent showing a video on how to obtain video data of the license plate and front bumper. Once the user obtains video data of the vehicle, the server 160 may ask the user to enter a start time and an end time for when video data was captured of the license plate, and may ask the user to enter a start time and an end time for when video data was captured of the bumper. The requests may be made in a chat interface. The server 160 may then split the video data into different portions, specifically a vehicle identity portion and a vehicle damage portion. An example is shown on display screen 1100 in FIGS. 11A and 11B. As can be seen, the video data has been split into a vehicle identity portion 1110 and a vehicle damage portion 1120 based on input received from the user. The server 160 may ask the user to review and decide whether or not video capture needs to be re-done. Alternatively, the server may automatically split the video data using video or image processing techniques.

The video data may be received by the server 160 in real-time. In this example, the video data obtained by the remote computing device 100 may be sent, via the communications module, to the server 160 continuously such that the server 160 receives the video data as a live or near live stream. The video data may be analyzed by the server 160 in real-time to ensure the video data is being captured correctly. For example, the video data may be analyzed to ensure the user is capturing the video data according to the instructions. As another example, the video data may be analyzed to ensure the user is capturing the video data in the correct direction. As yet another example, the video data may be analyzed to ensure the quality of the video data is sufficient for processing. If an error occurs, a prompt may be sent to the remote computing device indicating to the user that the video data capture sequence must restart.

Figure 12:
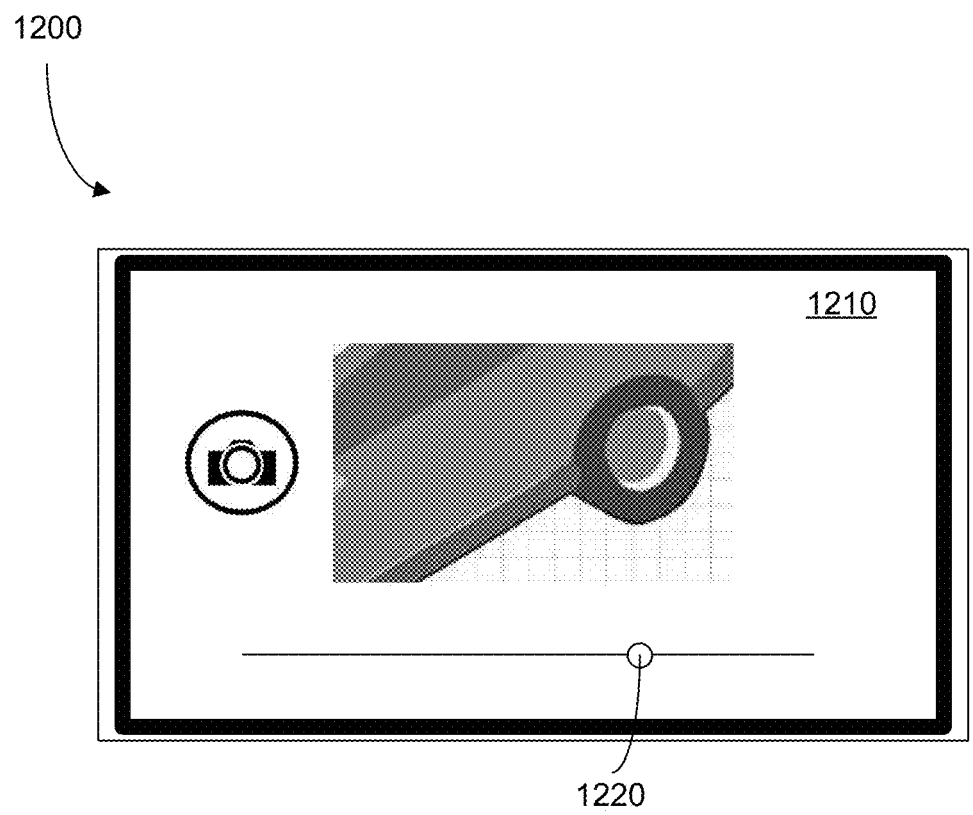
FIG. 12 is an example screen of a graphical user interface.

In an example of the video data being received by the server 160 in real-time, the server 160 may analyze the received video data and may send, via the communications module and to the remote computing device 100, data including a progress bar for display. An example display screen 1200 is shown in FIG. 12 wherein a video capture window 1210 and a progress bar 1220 are displayed. As can be seen, the user is capturing video data of the driver side of the vehicle. As the user walks from the front to the back of the vehicle, the progress bar 1220 slides from a starting position (front of the vehicle) to an ending position (back of the vehicle). As will be appreciated, progress may be determined by the server 160 by analyzing the received video data to determine a portion of the vehicle currently being captured. For example, identifying features may be identified in frames of the video data such as a front tire, a door handle, etc. Progress may be determined by the server 160 based on the instructions sent to the user. For example, a starting point and an ending point may be identified based on the instructions sent to the user and progress may be determined accordingly.

As will be appreciated, during video capture the remote computing device 100 may automatically adjust camera settings. For example, the remote computing device 100 may automatically zoom in or out and/or may automatically focus. In another example, the remote computing device 100 may automatically begin obtaining video data when, for example, a license plate or VIN is detected through the camera by the server. Camera data obtained by the remote computing device 100 may be communicated to the server 160 in real time and the camera data may be processed to identify the license plate or VIN of the insurance policy data and when identified, the server may prompt the remote computing device 100 to begin recording video data.

As another example of the video data being received by the server 160 in real-time, the server 160 may receive, via the communications module and from the remote computing device 100, video data and sensor data in real-time. In this example, the server 160 may analyze the received video data and sensor data to determine a location of the remote computing device 100 as it is obtaining video data. The location of the remote computing device 100 may be used to determine progress of the video data capture and the server may update a progress bar accordingly, similar to that described above. For example, in the event that a user walks around the vehicle in a circle with the remote computing device 100 while obtaining vehicle data, the location of the remote computing device 100 may be tracked and the progress may be estimated or determined accordingly. The sensor data may be mapped to portions of the captured video data which may help or simplify video data processing.

The video data is processed to confirm an identity of the vehicle and to numerically quantify an amount of damage to the vehicle (step 840).

Various techniques may be employed to confirm the identity of the vehicle. For example, the instructions sent to the remote computing device may indicate to the user that the starting point of the video is to obtain the VIN. As such, the server 160 may analyze video data obtained at the beginning of the video and may perform optical character recognition within the video data to identify text in the video data to obtain the VIN. The VIN obtained from the video data may be compared to the VIN obtained from the insurance policy data and if there is a match, the identity of the vehicle is confirmed. Of course, if there is not a match, an error may be sent from the server 160 via the communications module and to the remote computing device 100 indicating to the user that the identity of the vehicle cannot be confirmed. As another example, the server may obtain image data from the video data by selecting one or more frames therefrom. The image data may be analyzed by the server 160 by performing optical character recognition on the image to identify text in the image. The text may be for example the VIN or license plate and this may be compared to the insurance policy data to determine if there is a match. As will be appreciated, the identity of the vehicle may be confirmed while the video data is analyzed in real-time during step 830. In real-time, if the identity of the vehicle does not match the insurance policy data, an error may be sent to remote computing device and video data capture may be shut down.

Various techniques may be employed to numerically quantify the amount of damage to the vehicle. For example, photo-based estimation may be used wherein the server 160 may obtain image data from the video data by selecting one or more frames or images therefrom. The image data may then be analyzed by the server 160 to determine a location of any damage represented in the image and may determine an estimate based on the location of the damage and the type of vehicle.

As an example of photo-based estimation, the server 160 may analyze the image data to obtain an indicator. The indicator may numerically quantify an amount of damage to the insured vehicle. For example, the server 160 may analyze the image data to obtain a damage quantum indicator. The damage quantum indicator may numerically quantify an amount of damage to the insured vehicle. For example, the damage quantum indicator may be an estimate of the value of a repair, replacement or claim.

In determining the indicator, image processing techniques may compare the vehicle in the image data to image data representing a base vehicle (i.e., an undamaged vehicle). The image data representing the base vehicle may, for example, including a mapping of parts. For example, the image data representing the base vehicle may be an image of a vehicle which includes markers or identifiers indicating a part associated with various portions of the image. Upon identifying location(s) of the received image data that do not sufficiently correspond to similar locations in the image data of the base vehicle, the server 160 may determine that such locations represent damaged components and may then identify the damaged components from the mapping of parts. A lookup may then be performed in a database to determine a value associated with the damaged components.

Figure 11A:
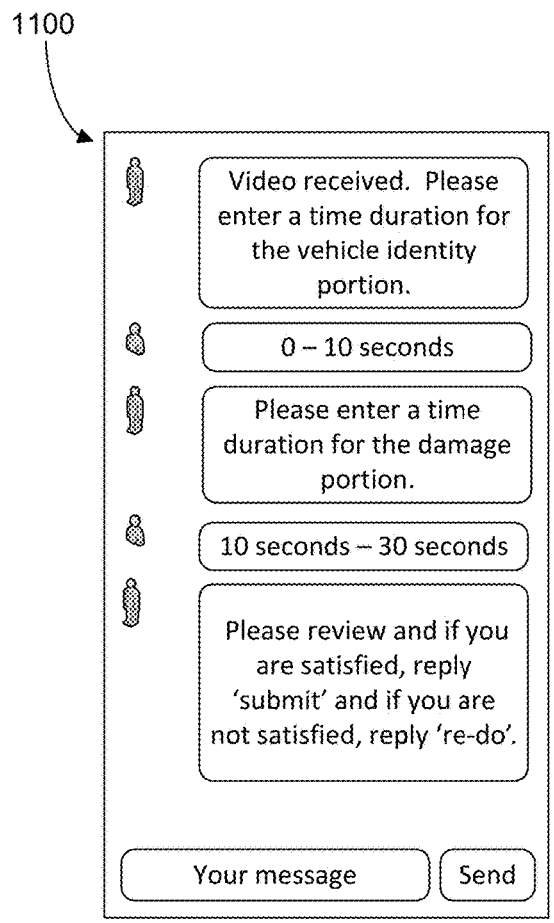
FIGS. 11A and 11B are example screens of graphical user interfaces.
Figure 11B:
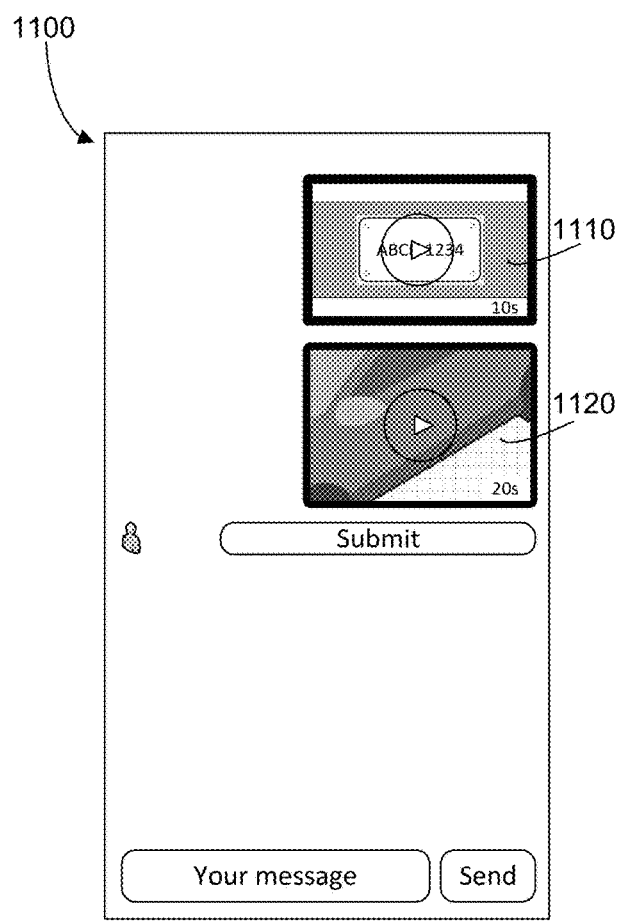

In the example shown in FIGS. 11A and 11B, the server 160 may analyze the vehicle identity portion 1110 and the vehicle damage portion 1120. For example, the server 160 may obtain a single image frame from the video data during when the license plate was captured and may analyze the single image frame to determine the license plate number. Similarly, the server 160 may obtain a single image from the video data during when the bumper was captured and may analyze the single image frame to quantify an amount of damage done to the vehicle.

The server 160 may then send, via the communications module and to the remote computing device 100, a numerical value based on the indicator. For example, the server 160 may send, via the communications module and to the remote computing device, a numerical value based on the damage quantum indicator. The numerical value may, for example, be an estimate.

Figure 13:
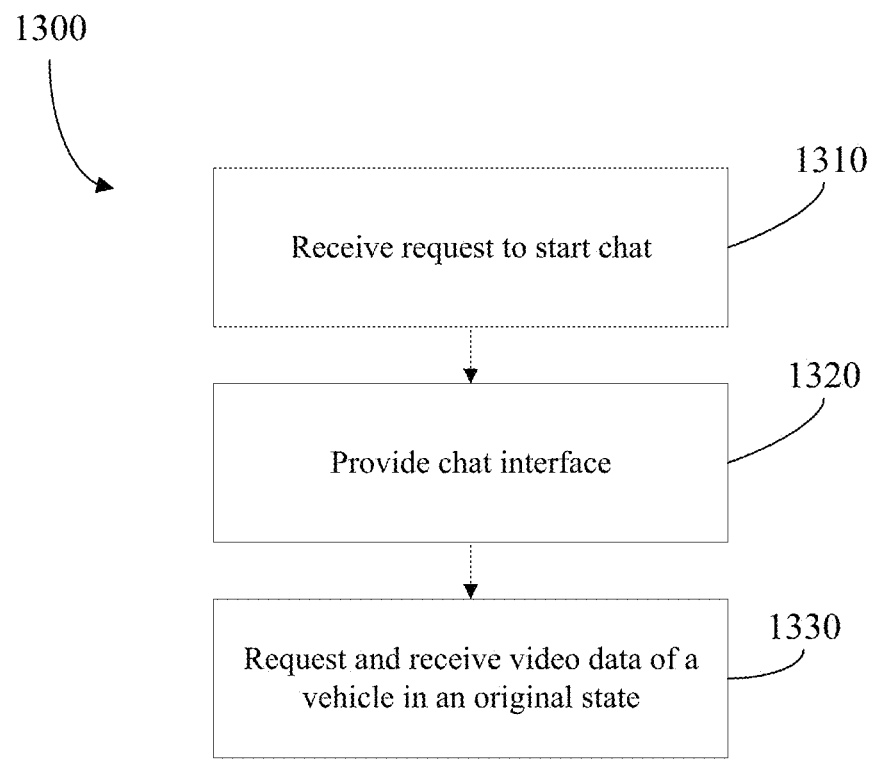
FIG. 13 is a flowchart showing operations performed by a server for onboarding a vehicle.

In embodiments of photo-based estimation described above, image processing techniques are described wherein image data of a vehicle is compared to image data representing a base vehicle (i.e. an undamaged vehicle). In some embodiments, comparing image data to image data of an undamaged vehicle may not be accurate as a vehicle may have obtained previous damage prior to filing a claim and/or the vehicle may have after-market upgrades or modifications. As such, video or image data of a vehicle may be obtained during onboarding before an insurance policy has begun. An exemplary method of onboarding a vehicle is shown in FIG. 13 and is generally identified by reference numeral 1300. The operations in method 1300 are performed by server 160. More specifically, computer-executable instructions stored in memory of the server 160 may, when executed by a processor of the server 160, configure the server 160 to perform the method 1300 or a portion thereof.

The method 1300 begins when a request is received from a remote computing device to initiate a chat session (step 1310). In this embodiment, the chat session may be initiated by a user of the remote computing device during the process of insuring a vehicle. The chat session may be requested through an internet interface, mobile application, etc. In this example, it is assumed that the identifying information of the user and the vehicle were previously obtained by the server 160. However, as will be appreciated, this information may be obtained using the chat session.

Figure 14:
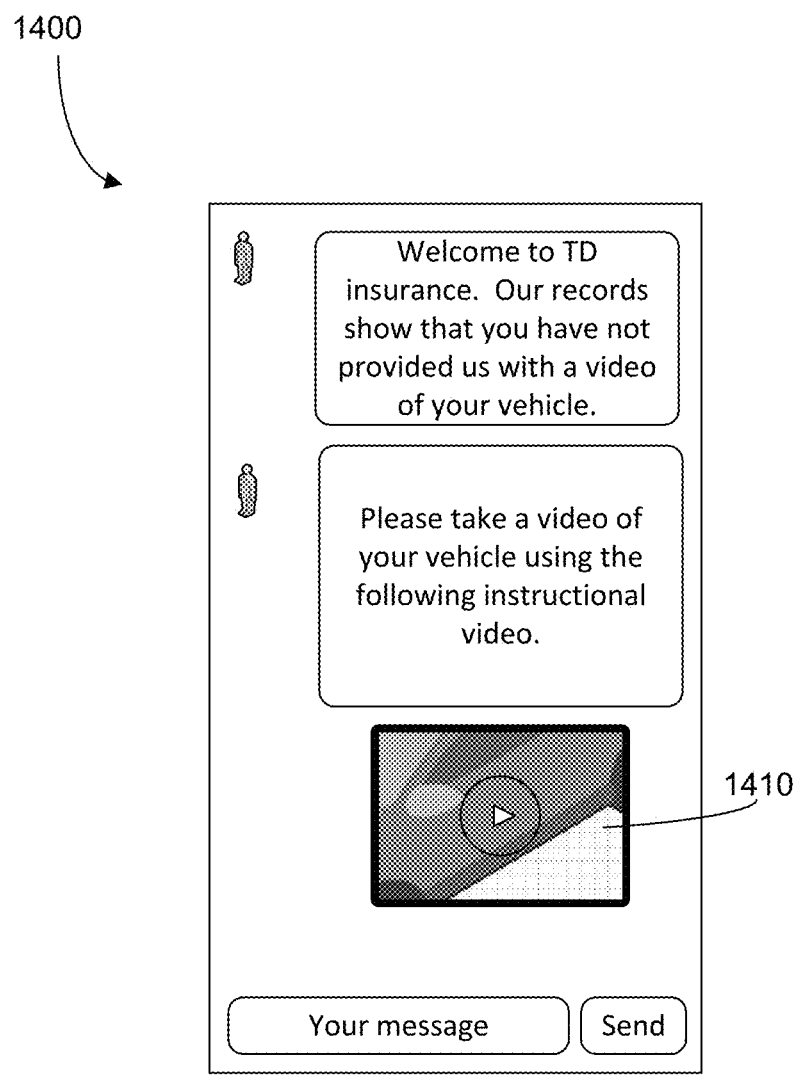
FIG. 14 is an example screen of a graphical user interface.

In response, the server 160 provides a chat interface to the remote computing device 100 (step 1320). In this embodiment, the server 160 sends, via the communications module and to the remote computing device 100, data that includes a chat interface. An example chat interface 1400 is shown in FIG. 14.

During the chat session, the server 160 requests and receives video data of a vehicle in an original state (step 1330). In the example shown in FIG. 14, the server 160 communicates instructions in the form of video instructions 1410 to the remote computing device and asks the user to obtain video data of the vehicle, similar to that described above. The video instructions may include a starting point and an ending point, similar to that described above. The video instructions may request that the user capture video data of the VIN or license plate of the vehicle, similar to that described above. As will be appreciated, in another example the server may request that video data be obtained using a particular camera such as for example a 3D camera (e.g. Mantis Vision technology). The vehicle may be brand new or may have damage. As such, the original state is the state that the vehicle is in at the time of onboarding.

As will be appreciated, other features described above may be utilized such as for example the use of a progress bar and/or sensor data.

Figure 15:
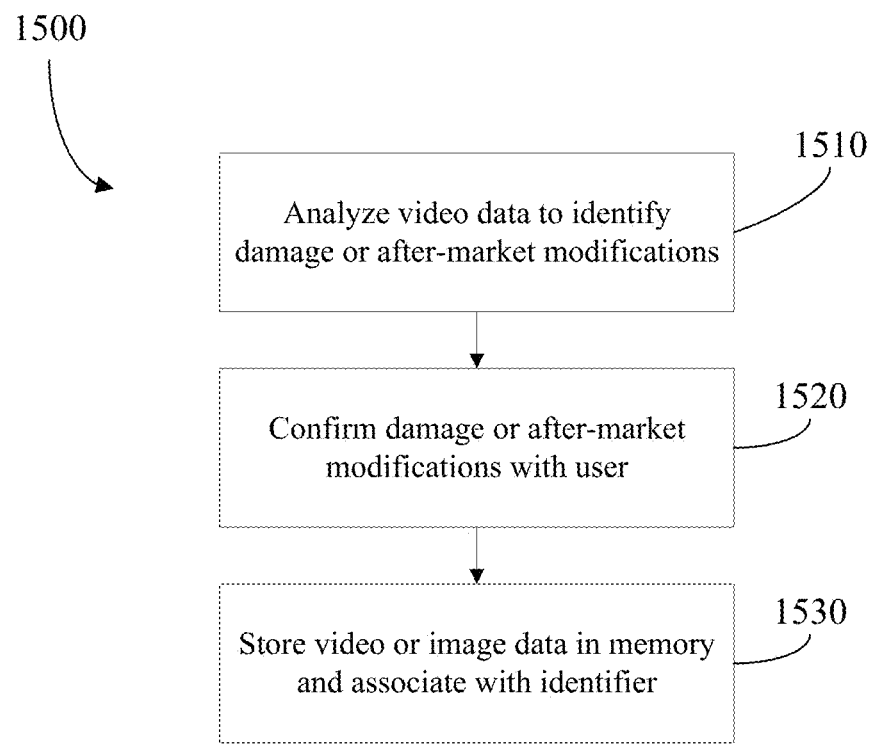
FIG. 15 is a flowchart showing operations performed by a server for determining an original state of a vehicle.

Once received, the server 160 may analyze the video data of the vehicle in the original state according to a method 1500 shown in FIG. 15. The operations in method 1500 are performed by server 160. More specifically, computer-executable instructions stored in memory of the server 160 may, when executed by a processor of the server 160, configure the server 160 to perform the method 1500 or a portion thereof.

During method 1500, the video data is analyzed to identify any pre-existing damage and to identify any after-market modifications (step 1510). In this embodiment, the video data is analyzed in a similar manner to that described in step 840 of method 800 in that one or more frames of the video data of the vehicle in the original state may be obtained and compared to image data representing a base vehicle (i.e. an undamaged vehicle).

If any pre-existing damage or after-market modifications are identified, the server confirms the pre-existing damage or after-market modifications with the user (step 1520). For example, the server may ask the user to confirm damage or after-market modifications within the chat interface.

Figure 16:
FIG. 16 is an example screen of a graphical user interface.

An example chat interface 1600 is shown in FIG. 16. As can be seen, the server confirms receipt of the video data of the vehicle. In this example, during step 1510 the server analyzes the video data and identifies damage to the driver side door. The server provides an image obtained from the video data and asks the user to confirm that there is indeed damage to the passenger side door.

Once pre-existing damage and/or after-market modifications are confirmed, the server 160 stores image data or video data associated with the pre-existing damage and/or after-market modifications in memory (step 1530). The server may also store data regarding the damage. The data may include a day/time that the damage was confirmed. The data may also include a screen-shot of the user confirming the damage and/or after-market modification. The server may generate a 3D model of the vehicle that includes the pre-existing damage and/or after-market modifications. The 3D model may be used in a manner similar to that described above.

The server 160 may analyze the video data and segment the video data into different parts or frames. For example, the server 160 may identify the VIN or license plate of the vehicle, using techniques described above, and may store a frame or a part of the video data that shows the VIN or license plate in the memory. Further, the server 160 may identify a passenger door in the video data and may store a frame or a part of the video data that shows the passenger door. Each stored frame or part of video data may be labelled with a descriptor such as for example "passenger door" or "license plate".

The video or image data obtained of the vehicle in the original state (during onboarding) may be used to facilitate photo-based estimation. For example, damage indicated during onboarding may be taken into consideration during photo-based estimation such that any pre-existing damage is not included in the estimate.

Figure 17:
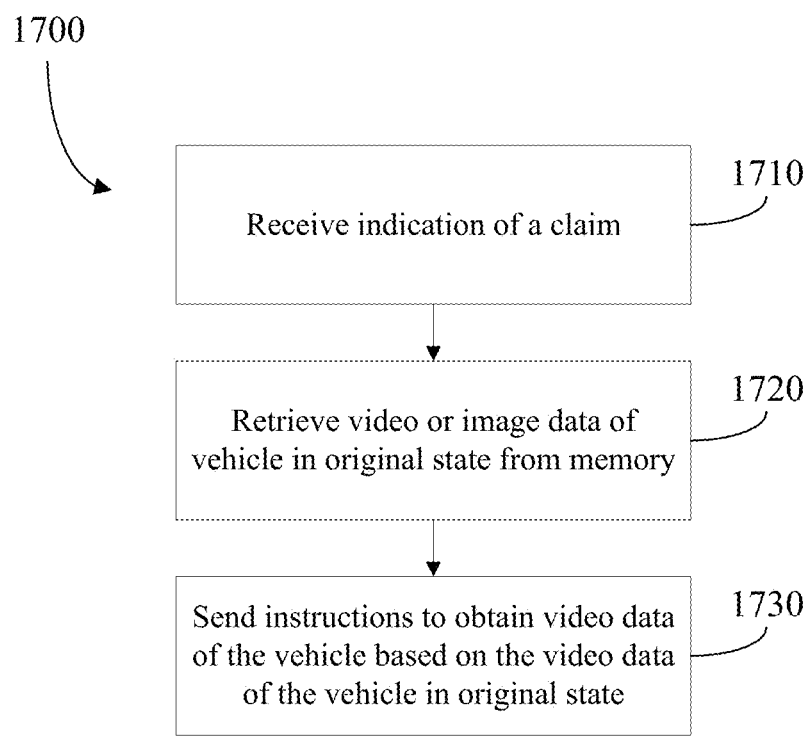
FIG. 17 is a flowchart showing operations performed by a server for instructing a user to obtain video data.

As another example, in the event that a user submits a claim, video or image data obtained during onboarding may be used to instruct the user how to obtain video data of the vehicle. An example method 1700 where video or image data obtained during onboarding is used to instruct a user is shown in FIG. 17. The operations in method 1700 are performed by server 160. More specifically, computer-executable instructions stored in memory of the server 160 may, when executed by a processor of the server 160, configure the server 160 to perform the method 1700 or a portion thereof.

The method begins when an indication of a claim is received by the server 160, the indication associated with an identifier (step 1710). The indication may be received from the remote computing device 100 in manners described above, for example during a chat session or in the event a user opens up a mobile application. The identifier may be a policy number, a name, address, contact information, a token, a PIN, a user name, biometric data, a password, etc.

Video or image data of the vehicle in the original state is retrieved from the memory (step 1720). The video or image data is obtained using the identifier. For example, video or image data stored during onboarding of the vehicle may be retrieved using the policy number.

Instructions for obtaining video or image data of the vehicle are sent to the remote computing device based on the video or image data of the vehicle in the original state (step 1730). The instructions may be video instructions, photo instructions and/or text instructions. The instructions may include a starting point and an ending point for video capture which may correspond to starting and ending points in the video or image data obtained of the vehicle in the original state.

For example, in the case where descriptors are used in a chat-based environment, the user may text that "the passenger door is damaged" and the server may obtain the "passenger door" frame or video data that was obtained during onboarding. The "passenger door" frame or video data may be sent to the remote computing device 100 and the server 160 may ask the user to capture image or video data of the damaged passenger door such that the captured image or video data has a similar view or start/end point as the "passenger door" frame or video data captured in the original state.

Once video or image data is obtained of the vehicle when submitting a claim, video or image data of the vehicle in the original state may be used to more accurately conduct photo-based estimation. For example, video or image data of a passenger door at the original state (obtained during on-boarding) may be compared to video or image data of the damaged passenger door to more accurately estimate a cost of repair. Since the video or image data of the passenger door is taken from a similar view or start/end point, processing and/or comparing the video or image data of the passenger door in the original state to the damaged passenger door is simplified and more efficient. As another example, the server may compare frames of video data obtained of the vehicle in the original state to frames of video data obtained of the vehicle in the damaged state. Since the user was instructed on how to obtain video data of the vehicle to match video data obtained of the vehicle in the original state, video or image processing is simplified.

It will be appreciated that video data obtained of the vehicle at the original state may be used, for example, during step 820 of method 800 such that the instructions sent to the user are based on video data obtained of the vehicle in the original state.

Although embodiments described above relate to vehicle insurance onboarding and/or claims processing, those skilled in the art will appreciate that at least some of the above embodiments may be used when a user rents or leases a vehicle. For example, when a user picks up a vehicle for rent, the user may capture video or image data of the vehicle in an original state. When the user drops the vehicle off, the user may capture video or image data of the vehicle in a returned state. The original state may be automatically compared to the returned state to determine if any damage has been done to the vehicle. An estimate of the damage done may be automatically determined using photo-based estimation as described above.

As will be appreciated, at least some of the above embodiments and examples may be implemented within a mobile application installed on the remote computing device. The mobile application may include other features some of which may be based on the geographical location of the remote computing device. For example, the server may associate a geographical location each time an insurance claim is processed or made through the mobile application. In the event that a particular geographical location is associated with multiple insurance claims, such as for example vehicle theft or vandalism, the server may flag this geographical location as being high-risk. The server may monitor the location of remote computing devices associated with users that have installed the mobile application and may send a warning or indication to the remote computing device informing the user that they are in a high-risk location. The warning or indication may offer to direct the user to a lower risk area. The server may also monitor the location of remote computing devices associated with users that have installed the mobile application and may inform them of potential parking violations, etc.

In embodiments described above, obtaining video data using the remote computing device is described. Those skilled in the art will appreciate that other camera, image or video devices may be used to obtain video data in 2D or 3D.

In some embodiments, the server 160 and the remote computing device 100 may communicate through encrypted communications and the server 160 may only receive video data obtained through such encrypted communications.

In some instances, there may be a lag between a time when video data is obtained and a time when the video data is sent to the server. Such a lag may be caused, for example, because a user may be provided with an opportunity to review the video data or because a user may wish to wait to upload the video data until they are connected to Wi-Fi. The lag may provide an opportunity for tampering in at least some situations. In some embodiments, in order to prevent tampering, a hash, such as SHA-256 hash may be performed immediately after the video data is obtained and may be sent to the server. Later, after the server receives the video data, the server may use the hash to confirm that the received video data is the original video data.

The methods described above may be modified and/or operations of such methods combined to provide other methods.

Furthermore, while the description above generally refers to vehicles, any reference to a vehicle could be replaced with other property.

Furthermore, the description above generally describes operations that may be performed by a server and a remote computing device in cooperation with one another. Operations that are described as being performed by the server may, instead, be performed by the remote computing device.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server comprising:
   a communications module;
   a processor coupled to the communications module; and
   a memory coupled to the processor, the memory storing processor-executable instructions which, when executed by the processor, configure the processor to:
      provide, via the communications module and to a remote computing device, a chat interface to initiate a live chat session associated with a claim; and
      within the live chat session:
         send, via the communications module and to the remote computing device, video instructions for obtaining video data of a vehicle based on video data of the vehicle in an original state previously received from the remote computing device and stored in the memory, the video instructions for obtaining video data of the vehicle including a video that shows how to obtain video data of the vehicle to match the video data of the vehicle in the original state previously received from the remote computing device and stored in the memory;
         receive, via the communications module and from the remote computing device, video data of the vehicle captured in accordance with the video instructions;
         compare video data of the vehicle in the original state to video data of the vehicle captured in accordance with the video instructions to quantify an amount of damage to the vehicle; and
         send a message that includes a numerical value based on the quantified amount of damage to the vehicle.

2. The server of claim 1, wherein the processor-executable instructions, when executed by the processor, further configure the processor to:
   receive, via the communication module and from the remote computing device, the video data of the vehicle in the original state; and
   store, in the memory, the video data of the vehicle in the original state.

3. The server of claim 2, wherein the video data of the vehicle in the original state is received during an onboarding process.

4. The server of claim 3, wherein the original state includes a state of the vehicle at a time of execution of the onboarding process.

5. The server of claim 3, wherein the onboarding process is performed within another live chat session.

6. The server of claim 2, wherein the processor-executable instructions, when executed by the processor, further configure the processor to:
   process the video data of the vehicle in the original state to identify at least one of pre-existing damage to the vehicle and aftermarket modifications made to the vehicle.

7. The server of claim 1, wherein the video instructions for obtaining video data of the vehicle include video instructions for obtaining video data of the vehicle at a damage location.

8. The server of claim 1, wherein the video instructions for obtaining video data of the vehicle include an indication of a starting point and an ending point for video capture.

9. The server of claim 1, wherein the video instructions for obtaining video data of the vehicle include video instructions for capturing an identifier of the vehicle.

10. The server of claim 1, wherein the video instructions for obtaining video data of the vehicle include a portion of the video data of the vehicle in the original state based on a damage location.

11. A method comprising:
    providing, via a communications module and to a remote computing device, a chat interface to initiate a live chat session associated with a claim; and
    within the live chat session:
       sending, via the communications module and to the remote computing device, video instructions for obtaining video data of a vehicle based on video data of the vehicle in an original state previously received from the remote computing device and stored in memory, the video instructions for obtaining video data of the vehicle including a video that shows how to obtain video data of the vehicle to match the video data of the vehicle in the original state previously received from the remote computing device and stored in memory;
       receiving, via the communications module and from the remote computing device, video data of the vehicle captured in accordance with the video instructions;
       comparing video data of the vehicle in the original state to video data of the vehicle captured in accordance with the video instructions to quantify an amount of damage to the vehicle; and
       sending a message that includes a numerical value based on the quantified amount of damage to the vehicle.

12. The method of claim 11, further comprising:
    receiving, via the communication module and from the remote computing device, the video data of the vehicle in the original state; and
    storing, in the memory, the video data of the vehicle in the original state.

13. The method of claim 12, wherein the video data of the vehicle in the original state is received during an onboarding process.

14. The method of claim 13, wherein the original state includes a state of the vehicle at a time of execution of the onboarding process.

15. The method of claim 13, wherein the onboarding process is performed within another live chat session.

16. The method of claim 12, further comprising:
    processing the video data of the vehicle in the original state to identify at least one of pre-existing damage to the vehicle and aftermarket modifications made to the vehicle.

17. The method of claim 11, wherein the video instructions for obtaining video data of the vehicle include video instructions for obtaining video data of the vehicle at a damage location.

18. The method of claim 11, wherein the video instructions for obtaining video data of the vehicle include an indication of a starting point and an ending point for video capture.

19. The method of claim 11, wherein the video instructions for obtaining video data of the vehicle include instructions for capturing an identifier of the vehicle.

20. A non-transitory computer readable storage medium comprising computer-executable instructions which, when executed, configure a computing device to:

provide, via a communications module and to a remote computing device, a chat interface to initiate a live chat session associated with a claim; and within the live chat session:
- send, via the communications module and to the remote computing device, video instructions for obtaining video data of a vehicle based on video data of the vehicle in an original state previously received from the remote computing device and stored in memory, the video instructions for obtaining video data of the vehicle including a video that shows how to obtain video data of the vehicle to match the video data of the vehicle in the original state previously received from the remote computing device and stored in memory;
- receive, via the communications module and from the remote computing device, video data of the vehicle captured in accordance with the video instructions;
- compare video data of the vehicle in the original state to video data of the vehicle captured in accordance with the video instructions to quantify an amount of damage to the vehicle; and
- send a message that includes a numerical value based on the quantified amount of damage to the vehicle.

* * * * *